US008145627B2

(12) United States Patent
Al-Omari

(10) Patent No.: US 8,145,627 B2
(45) Date of Patent: Mar. 27, 2012

(54) USE OF CONNECTIVITY ANALYSIS TO ASSIST RULE-BASED OPTIMIZERS

(75) Inventor: Awny K. Al-Omari, Cedar Park, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1805 days.

(21) Appl. No.: 11/150,388

(22) Filed: Jun. 10, 2005

(65) Prior Publication Data

US 2006/0282422 A1    Dec. 14, 2006

(51) Int. Cl.
*G06F 7/00* (2006.01)
*G06F 17/30* (2006.01)
(52) U.S. Cl. ..................................... 707/718; 707/797
(58) Field of Classification Search .................. 707/713, 707/718, 797
See application file for complete search history.

(56) References Cited

U.S. PATENT DOCUMENTS

| 5,819,255 | A | | 10/1998 | Celis et al. | |
|---|---|---|---|---|---|
| 5,822,747 | A | | 10/1998 | Graefe et al. | |
| 6,032,144 | A | * | 2/2000 | Srivastava et al. | 707/3 |
| 6,092,062 | A | * | 7/2000 | Lohman et al. | 707/2 |
| 6,205,441 | B1 | | 3/2001 | Al-omari et al. | |
| 6,341,281 | B1 | * | 1/2002 | MacNicol et al. | 707/3 |
| 6,360,214 | B1 | * | 3/2002 | Ellis et al. | 707/2 |
| 6,438,741 | B1 | | 8/2002 | Al-omari et al. | |

OTHER PUBLICATIONS

Wikipedia, "Search space", http://web.archive.org/web/20040731082822/http://en.wikipedia.org/wiki/Search_space, published Mar. 16, 2004, printed Feb. 27, 2009, 2 pages.*

* cited by examiner

*Primary Examiner* — Phong Nguyen

(57) ABSTRACT

Methods and systems receive a normalized query tree and analyze the tree to collect information about join operators and their children, and tables in an associated query. This information is then made available to a rule based optimizer that is configured to produce, from the normalized query tree, an execution plan. In addition, in at least some embodiments, an extensible framework is provided for join order optimization via the use of a multi-join operator and multi-join rules as part of the general framework of a query optimizer.

18 Claims, 17 Drawing Sheets

USE OF CONNECTIVITY ANALYSIS TO ASSIST RULE-BASED OPTIMIZERS

BACKGROUND

SQL/MX has a state of the art compiler that is designed to handle complex DSS queries, in addition to simpler OLTP queries. The SQL/MX compiler has a unique architecture that makes it one of today's most capable and extensible database compilers in the industry. In addition to designing a compiler with a large number of advanced features, the designers of the first MX compiler paid special attention to the extensibility of the product. Among U.S. Patents that pertain to SQL/MX optimizers are: U.S. Pat. Nos. 5,819,255; 5,822,747; 6,205,441; and 6,438,741, which are commended to the reader for additional background information.

A SQL/MX compiler consists of several phases to generate an efficient execution plan. First, a query is passed to a parser where syntactic checking is performed and an initial query tree is built. Next, a binder performs semantic checks and binds query variables to database objects. This is followed by a normalizer phase where subquery transformation and other unconditional query transformations take place. The normalizer transforms the query into a canonical tree form before passing it to an optimizer to determine the execution strategy.

In this system, the optimizer uses what is known as a Cascades search engine as the platform for the optimization process. The Cascades search engine is described in U.S. Pat. Nos. 5,819,255 and 5,822,747. The Cascades search engine is a multi-pass, rule-based, cost-based optimization engine. The optimization search space is determined by the set of transformation and implementation rules used by the optimizer. Rules are applied recursively to the initial normalized tree transforming it into semantically equivalent query trees. The transitive closure of the rules applications defines the optimization search space. The optimizer output is a single plan with the lowest cost among all traversed plans in the search space, based on the optimizer's cost model.

As will be appreciated by the skilled artisan, the main advantage of this optimizer lies in the fact that it is rule driven. One can change the search space or search algorithm by simply adding, removing, or changing rules. This offers a great deal of extensibility. Adding a new optimization feature could be as easy as adding a new rule. For example, assume we want to add the feature of eliminating unnecessary Group Bys. This can be achieved by adding a new transformation rule that applies to Group Bys and checks for the condition for elimination (grouping on a unique column). If the condition is satisfied, the rule will eliminate the Group By from its output (a MapValueId on top of the child of the Group By). This rule would apply automatically to both the original Group Bys and the Group Bys generated as an output of other rules.

The main weakness of the Cascades optimizer, however, is performance. The Cascades optimizer uses a complete set of rules (commutativity and left-shift rules) to exhaustively enumerate all the possible join orders. Although the Cascades approach uses the principle of optimality (implemented via Cascades memo, groups and contexts) to significantly reduce the complexity of the exhaustive search algorithm, the complexity remains exponential even when the search space is limited to zigzag and left linear trees. The explosion of the explored search space evidently manifests itself as a compile-time explosion.

The initial optimizer design relied on cost-based pruning and lower bound limit as the potential mechanism to control the search space (this is the "bound" in "branch and bound"). The goal is to use a cost limit, based on the cost of the cheapest plan computed so far, to prune parts of the search space that have a lower bound above the cost limit. Although the technique was helpful in reducing compile time, the pruning rate is far less than what is required to control the exponentially increasing search space.

Compiling a complex query within a short period of time is, by itself, not the challenge. The real challenge is to compile it within a reasonable period of time, yet produce a plan with quality comparable to that generated by the expensive exhaustive search.

Reducing compile time and improving plan quality are the two ever-competing goals for any SQL compiler. More often than not an attempt to improve one of the two will have a negative effect on the other. Hence, a discussion of compiler performance is only relevant in the context of plan quality.

Accordingly, this invention arose out of concerns associated with providing improved compiler performance and plan quality.

DETAILED DESCRIPTION

Overview

Figure 1:
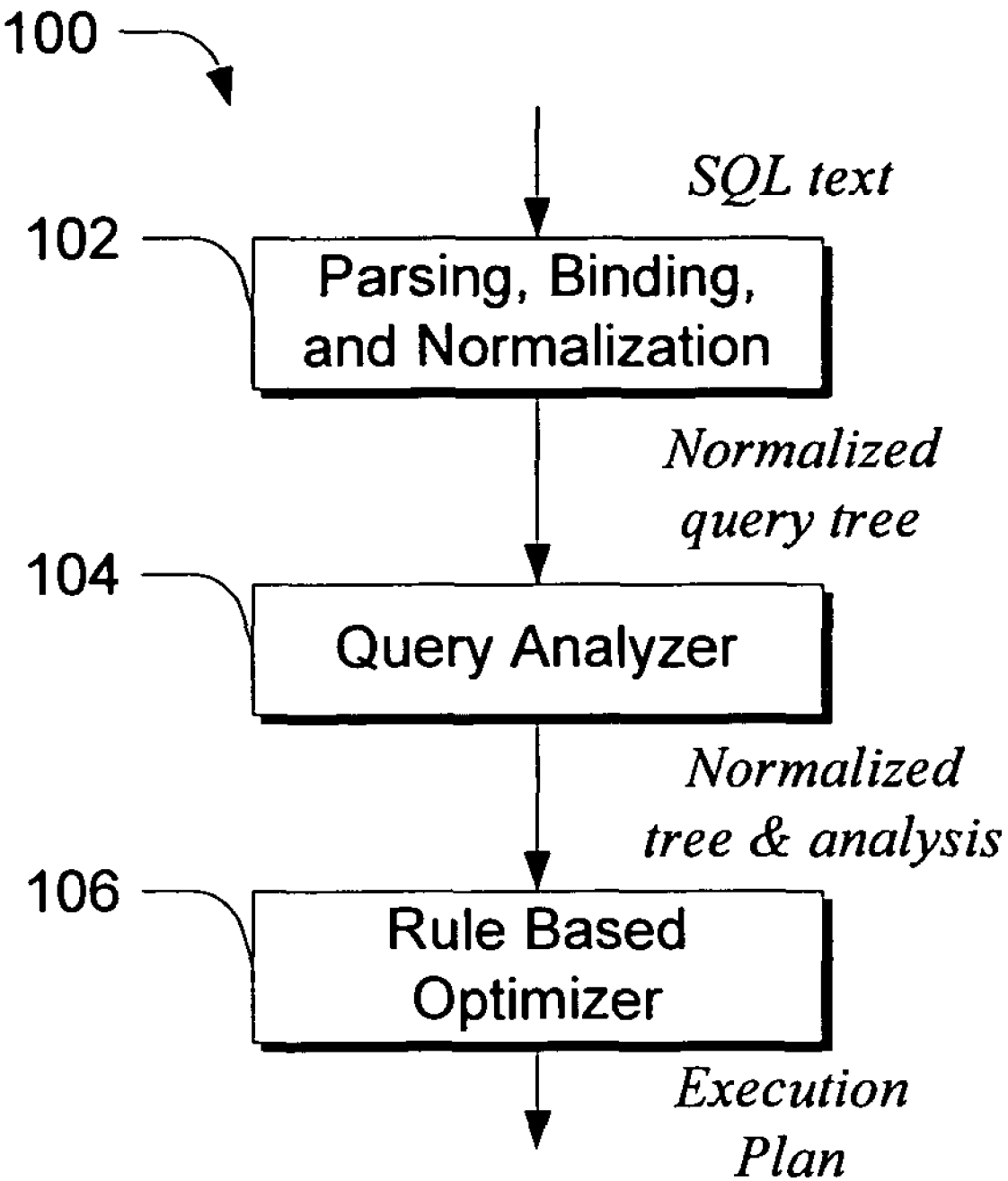
FIG. 1 is a diagram that illustrates a SQL/MX compiler flow process in accordance with one embodiment.

The compile-time control approaches attempted in the past introduce pruning to the exhaustive search algorithm based on certain criteria (heuristic-based, cost-based, or random). Rather than walking the search space in small steps exhaustively and relying on pruning parts of it, it should be more efficient to step directly into promising parts of the search space. This general approach will be referred to as large-scope optimization. This approach utilizes new enumeration schemes that visit only chosen parts of the hypothetical search space that are promising for good plans.

Large-scope optimization approach offers much more control over the traversed search space and, hence, the compile-time. This comes at the expense of potentially losing optimal plans that could lie outside the traversed region of the enumeration schemes. Nevertheless, this approach is expected to be superior to the pruning approaches for queries beyond a certain complexity. The reason is that the exhaustive search space grows faster than the rate of any conservative pruning that attempts not to lose the optimal plan. So while for simpler queries (which take less time to compile) the exhaustive search with pruning is superior, for more complex ones (with the increase of the compile time) large-scope optimization should do better.

Optimization schemes are defined and implemented by optimization rules. Rules implementing large-scope optimization have a large operation scope, and may require information about the query as a whole.

In the discussion that follows just below, a high level description of the inventive embodiments that extend an optimizer to support these types of optimization rules appears. Following these few paragraphs, individual main sections entitled "Query Analyzer", "Multi-Join Rules" and "Combining Selective and Exhaustive Schemes" appear and describe aspects of the inventive approach.

In general, solving the problem for an arbitrary query could prove quite difficult and cumbersome. A query tree could have a complex structure of nested subqueries and various join, group by, union, or scan operators. On the other hand, join permutations are the main reason behind the explosion of the exhaustive search space. A multi-way join between multiple expressions (a Join Backbone) could generate an exponential number of join expressions to be considered in the exhaustive scheme.

By focusing on solving the combinatorial problem within each join backbone (JBB) we can simplify the overall problem significantly. Rules can apply on the entire JBB (or part of it) generating output in the form of a fully or partially specified join subtree. Analysis of the join and local predicates yields the visibility needed for such rules. The JBB children below the join can uniquely identify the logical properties of any join in the output subtree. Hence, finding equivalent expressions within the JBB is simple and efficient. Moreover, since join permutations can cause compile-time explosion, optimizing JBBs via large-scope optimization rules is a major compile-time saving.

Note that this is indeed a "divide and conquer" approach, which is consistent with Cascades design. A query tree can be divided into regions (Optimization Islands), where the aforementioned limitations can be solved independently. Each island in the query tree can then be optimized using rules that have visibility of the entire island. The operation scope of these rules can be the entire Optimization Island or just part of it. The output of the rules is then inserted into Cascades without the need for expensive group merges.

To be able to break the query tree into JBBs we will add a pre-optimization query analysis phase directly after query normalization. During this phase, the join tree will be analyzed to setup the JBB information that can be accessible from any node in the JBB. Rules applying on the JBB would have the visibility of all join node properties and all join children. In addition to setting up the JBBs, the analysis phase will include analysis of table connectivities, table access paths and join reductions. Such analysis is prepared as services to help other optimizer components (mainly optimization rules) to make informed intelligent decisions.

Two Multi-Join rules are presented here. The first rule is referred to as the Multi-Join Enumeration Rule (i.e., MJEnumRule) and is an alternative for the existing LeftShiftRule which is the main driver for join enumerations. The LeftShiftRule is described in detail in U.S. Pat. No. 5,819,255 and is referred to therein as the "LeftShif rule". The second rule is referred to as the Multi-Join Prime Table Rule (i.e., MJPrimeTableRule) and is a rule that produces an over-all good plan to be implemented at early stage. The MJPrimeTableRule is presented only as example of using large scope Multi-Join rules for non-exhaustive selective search.

Query Analyzer

As mentioned earlier, the optimizer rule has a limited "visibility" of the current binding of the rule. For example, when Left Shift Rule is applied, only the properties of the two join expressions in the binding and the group attributes of the three leaf nodes are available. Although this is enough information to perform a correct transformation, it is much less than needed to do efficient search space pruning. For example, knowledge of the join connectivity between the leaf nodes in the rule's binding and other nodes outside the binding subtree can lead to effective pruning of the majority of joins resulting from such transformation.

Such information, however, is not available to the rule because expressions and groups in the top-down optimizer have, by design, no knowledge of their parent expressions. This is an important design feature in the optimizer memo that allows for multiple parent expressions to share the optimization results of common sub-expressions. Parent expressions generate physical requirements (contexts) for the optimization of the children. Parents issuing similar contexts can share the optimization results of the common child. This is the top-down optimizer way of applying the 'Principle of Optimality'. The downside of this architecture, however, is that it prevents the rule from traversing its parent(s) to examine valuable context insensitive properties outside the rule's binding tree, as will be appreciated by the skilled artisan.

This shortsightedness of the rule causes a serious limitation if we want to avoid the nearly exhaustive search. To target very promising plans, the rules need to make smart decisions based on a larger view of the query, tables, indexes, and join relations. The query analyzer component provides this "big picture" of the query. The connectivity analysis, in particular, enables the rule (or any subsequent component) to have a detailed view of the relations (connections) between the different tables and nodes in the query. Please note that this does not violate the Principle of Optimality since the optimization rules are still required to satisfy the optimization context.

The connectivity analysis task utilizes the normalizer output tree. This is because the normalizer flattens the join subtrees transforming the tree into a canonical form. Only subqueries that can't be left linearized remain at this point (left join, semi join, and correlated subqueries). For more information on normalizer subquery transformation, the reader is referred to U.S. Pat. No. 6,205,441. Since the query analyzer results are needed by later optimization components, this sets the right position for the analyzer component in the process flow to be directly after the normalization process.

As an example, consider FIG. 1 which illustrates a high level block diagram of an exemplary system generally at 100 in accordance with one embodiment. In this example, system 100 receives SQL text and performs, with one or more components, parsing, binding and normalization at 102. The output of this process is a normalized query tree which is provided to a query analyzer 104 which processes the normalize query tree to produce a normalized and analyzed tree to a rule based optimizer 106 which produces an execution plan.

More specifically, with regard to the query analyzer 104, consider the following.

During the query analysis phase, predicates are analyzed and relationships among query tables and joins children are examined. Query analysis performs two separate tasks; Join Backbone (JBB) Analysis, and Table Connectivity Analysis. The JBB Analysis task collects information about the join operators and their children to facilitate complex join tree transformations efficiently. The Table Connectivity Analysis task collects predicate relationship information between the tables (and columns) in the query, in order to assist heuristic decisions based on available indexes and natural sort orders and partitioning. In addition to the two tasks above, other analysis tasks useful for improving optimization decisions can be added as part of the query analysis phase.

The notion of the join backbone is important in the query analyzer. The purpose of JBB Analysis is to identify the join backbones and collect join connectivity information between each of the join backbone children. The notion of the join backbone, its children, and subsets are described below.

Join Backbone (JBB)

A join backbone refers to a multi-way join between two or more relational expressions. These relational expressions will be referred to as the Join Backbone children (JBBCs). The JBB is defined by the JBB children as well as the join types and join predicates between these children. After the normalizer has normalized the query tree, the tree is analyzed to identify the join backbones. The JBB is set during the analysis phase and remains unchanged during the optimization process. The JBB can be thought of as an invariant representation of the original join nodes, which is independent of the relative order of these nodes in the initial tree. Note that a query may have several join backbones.

Figure 2:
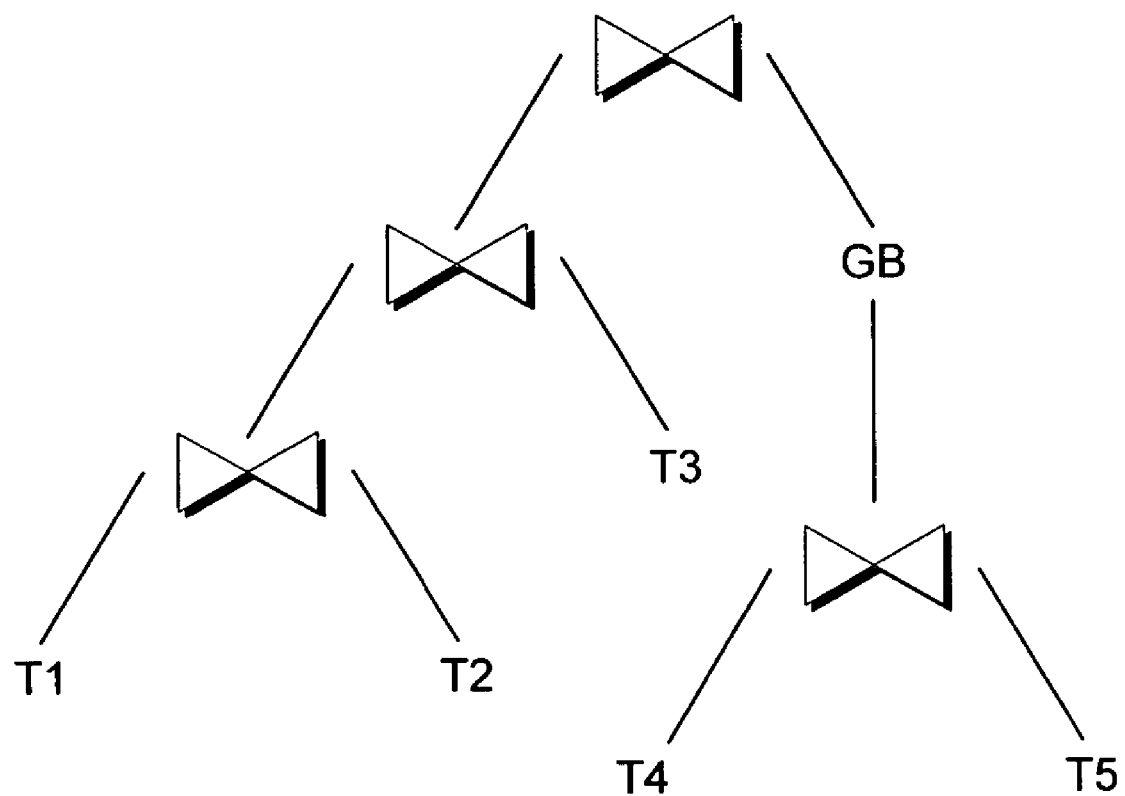
FIG. 2 illustrates a query that could have several join backbones (JBBs).

As an example, consider FIG. 2. Here, the query tree has a major join backbone (represented by the bow-tie icon) joining T1, T2, T3, and the Group By (GB) subquery. In addition there is a second join backbone in the subquery joining T4 and T5.

Join Backbone Child (JBBC)

A join backbone child (JBBC) refers to one of the joined expressions in the join backbone. Starting from the normalizer left linear join tree, the JBBCs will be the right children of all of the join nodes as well as the left child of the left most join node. It is important to note that not every JBBC is a table scan operator and vice versa.

In the example of FIG. 2, the first JBB has four JBBCs, namely, T1, T2, T3, and the group by operator. The second JBB has two JBBCs; T4 and T5.

Join Backbone Subset (JBBSubset)

A join backbone subset (JBBSubset) refers to a subset of the JBB children joined together. The subset has no notion of order between the JBBCs. It has also no notion of composition except as a flat set of JBBCs. This simple structure is most useful as it defines the logical equivalence between the different subtrees. For example, two expressions are logically equivalent if they have the same JBBSubset (and Characteristic Inputs). This simple identification allows us to improve work reuse as will be shown in later examples.

For example, in the context of the FIG. 2 query tree, possible subsets of the first JBB in the previous example are {T1}, {T2}, {T3}, {GB}, {T1, T2}, {T1, T3}, {T1, GB}, {T2, T3}, {T2, GB}, {T3, GB}, {T1, T2, T3}, {T1, T2, GB}, {T1, T3, GB}, {T2, T3, GB}, and {T1, T2, T3, GB}.

Figure 3:
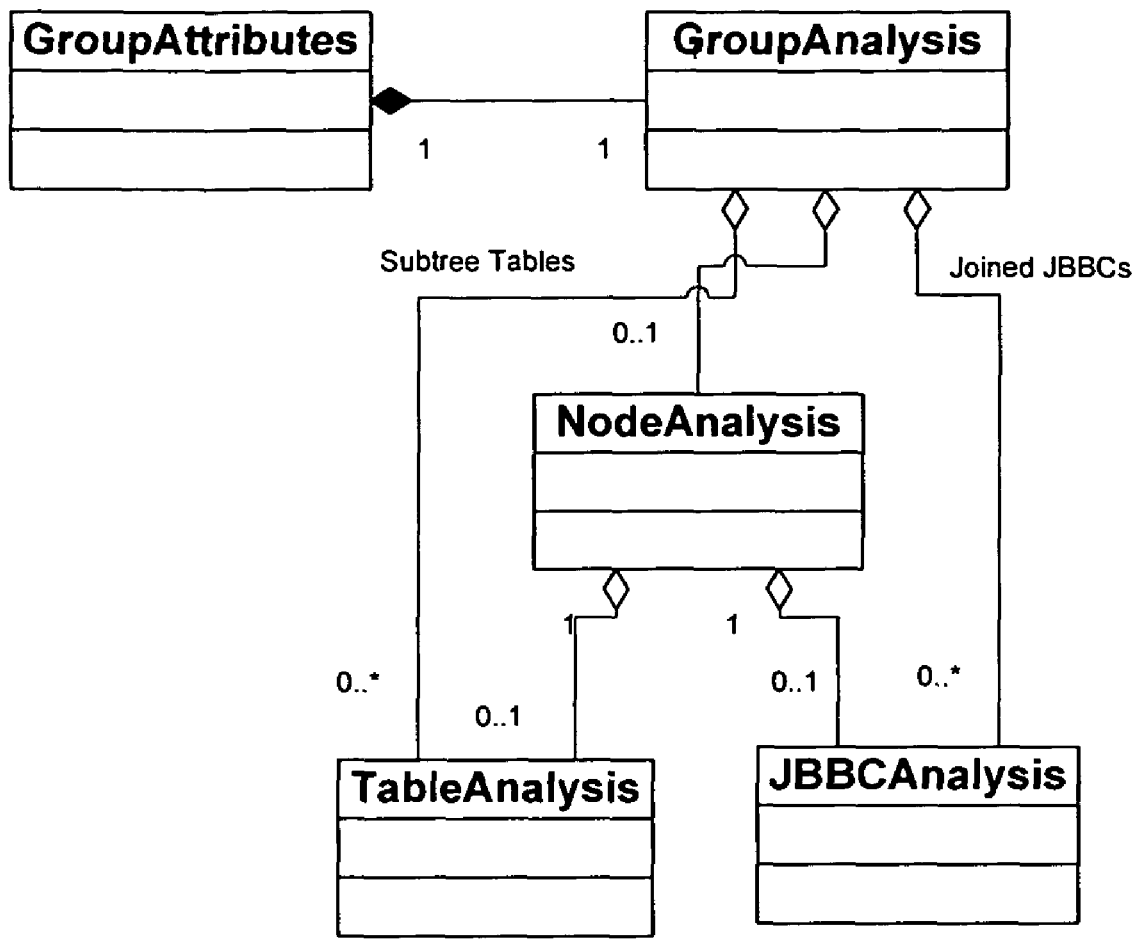
FIG. 3 is a class diagram for a group analysis object in accordance with one embodiment.

Analysis results computed during the query analyzer phase are captured in corresponding data structures. As an example, consider FIG. 3 which illustrates a class diagram for a GroupAnalysis structure in accordance with one embodiment.

Most operator nodes in the analyzed query tree are assigned a NodeAnalysis structure. The NodeAnalysis structure delegates various analysis aspects of the operator. Each NodeAnalysis has a unique NodeId. NodeAnalysis are only created during the analyzer phase and make up the basic blocks of composite analysis structures assigned to various subtrees during the optimization process. There are two main different analysis aspects of an expression that is delegated by NodeAnalysis. First, is the JBBC analysis results (JBBCAnalysis) and the second is the table analysis results (TableAnalysis).

The JBBCAnalysis data structure captures the relationship between a particular JBBC and all of its sibling JBBCs within a JBB. This includes joined JBBCs, joining predicates with each JBBC, and join types. As stated earlier, not every JBBC is a table and vice versa. Joins in the tree can be represented as a subset of JBBCs joined together. The join relationships between such a subset as a whole and any other JBBC or subset of JBBCs, can be computed efficiently based on the relationships between the individual JBBCs which is captured in the JBBCAnalysis structure.

The TableAnalysis data structure captures the predicate connectivity relations between a table (scan operator) and all other tables in the query. The purpose of this analysis structure is to enable efficient lookup for available access paths (indexes), natural sort orders, and partitioning.

In order to make the analysis results computed during the analyzer phase useful to optimizer rules and tasks, the analysis results should be accessible from within existing optimizer structures. The GroupAttributes class captures the logical properties shared among the expressions in Cascades memo group (See, e.g. U.S. Pat. No. 5,819,255). If an expression has not been inserted into the memo yet, the GroupAttributes class describes the logical properties of that standalone expression. The GroupAnalysis class has a 1-1 composition with GroupAttributes. In other words, there is exactly one GroupAnalysis object for every group in the memo structure and vice versa. The GroupAnalysis object is created and deleted by the GroupAttributes constructor and destructor, respectively. When GroupAttributes are primed, GroupAnalysis are also computed. The notion of a group in GroupAnalysis is the same as that in GroupAttributes, i.e., a memo group if the expression is inserted into memo, otherwise the standalone expression.

The GroupAnalysis structure contains analysis information that is applicable to the entire group. This can include properties of the group or aggregate properties of all expressions in the group. In the former case the property is computed usually based on the first expression inserted into the group. In the latter case, the property is initialized based on the first expression inserted in the group, and updated subsequently with every expression insertion. In the context of this disclosure, the GroupAnalysis structure has three properties, all from the category of common properties for all group expressions: nodeAnalysis, joinedJBBCs, and subtreeTables, each of which is discussed just below.

With regard to the nodeAnalysis property, consider the following. If this group represents a JBBC or base table, nodeAnalysis will point to the NodeAnalysis object of the JBBC or the table. If this group does not correspond to a JBBC or base table, nodeAnalysis will be NULL. Note that several groups could point to the same NodeAnalysis object as they may differ in their characteristic inputs.

With regard to the joinedJBBCs property, consider the following. If this group's first expression was a join, then joinedJBBCs is the JBBSubset value representing the join subtree. Note that although this property is computed usually based on the first expression inserted in the group, it is a common property for all expressions in the group. Note that several groups may have the same joinedJBBCs value as they may differ in their characteristic inputs.

With regard to the subtreeTables property, consider the following. This field is the set of all base tables that are leaves for this subtree. This field is applicable (not NULL) for all operators regardless of operator type.

For each new expression created during the optimization phase, the GroupAnalysis fields are computed based on the expression type and the GroupAnalysis values of the expression children.

The first step in the query analysis collection phase is assigning the basic analysis constructs i.e. NodeAnalysis. In this initial step the query tree is traversed recursively and new NodeAnalysis constructs (with corresponding NodeIds) are assigned for each of the following cases:
1. A NodeAnalysis with TableAnalysis object is created for each scan expression. The NodeAnalysis is assigned to the GroupAnalysis of the GroupAttributes of the scan node.
2. A NodeAnalysis with JBBC object is assigned to each expression that is a child of a Join expression. The NodeAnalysis is assigned to the GroupAnalysis of the GroupAttributes of that Expression. Note that if this expression is a scan node, both JBBC and TableAnalysis will belong to the same NodeAnalysis, i.e, a new JBBC object will be created and assigned to the existing NodeAnalysis of the scan node.

As an example, consider the following query:
select . . . .
from T1, (select . . . from T3, T4 where . . . group by . . . ) as S1, T2
where . . . .
group by . . . .

Figure 4:
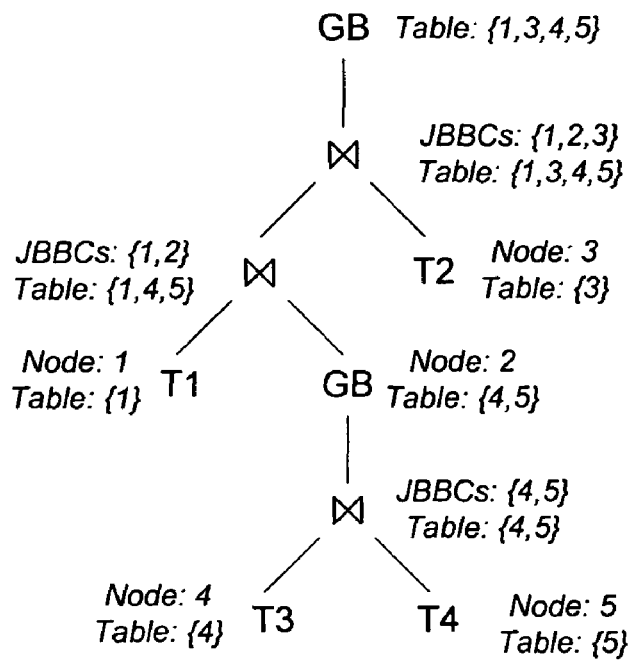
FIG. 4 illustrates assignment of node IDs and group analysis values for a normalizer output tree in accordance with one embodiment.

FIG. 4 shows the normalizer output tree for the query just above, along with assignments of NodeIds and GroupAnalysis values for the normalizer output tree. The analyzer assigns NodeIds for the several nodes in the tree (shown as "Node: #"). A NodeAnalysis object with TableAnalysis is created for each of the scans of T1, T2, T3, and T4. These NodeAnalysis objects are associated with the GroupAnalysis of the GroupAttributes of the scan nodes. A NodeAnalysis object with JBBC object is created for the lower Group By expression. A JBBC object will be created for each of the scans of T1, T2, T3, and T4 and assigned to their NodeAnalysis objects.

In addition, FIG. 4 shows the primed GroupAnalysis values for each node in the tree. The values of joinedJBBCs and subtreeTables for each join and group by expression are computed based on the GroupAnalysis values of their children.

Following the assignment of NodeAnalysis structures, the JBB Analysis task is invoked. During this task JBBCs are associated with their parent JBBs. Moreover, the relationships between sibling JBBCs are computed. These relations include join predicates, join types, and join data flow reductions.

The Table Connectivity Analysis captures connectivity relationships between the different base columns and base tables in the query. This is a hyper-graph because the edges could connect more than two nodes. The nodes in this graph represent the base columns. The connections (hyper-edges), on the other hand, represent the predicates in the query tree. The connections here are multi-way, i.e. an edge can connect multiple number of nodes (could exceed two). This can be viewed as the transitive closure of several two-way connections. The edges in this graph are not directional.

There are two types of predicate connections captured during the Table Connectivity Analysis task. The first is Reference Connection (RC) which consider two (or more) nodes to be connected if they are both referenced by this predicate. The second is Equivalence Connection (EC) which considers two (or more) nodes connected if they have an equality predicate. The former type, RC, is a superset of the latter, EC. In other words, every EC is an RC and the opposite is not always true. In general, EC is more relevant to optimizer heuristics since it is more helpful in improving access path choices and finding matching partitions.

Figure 5:
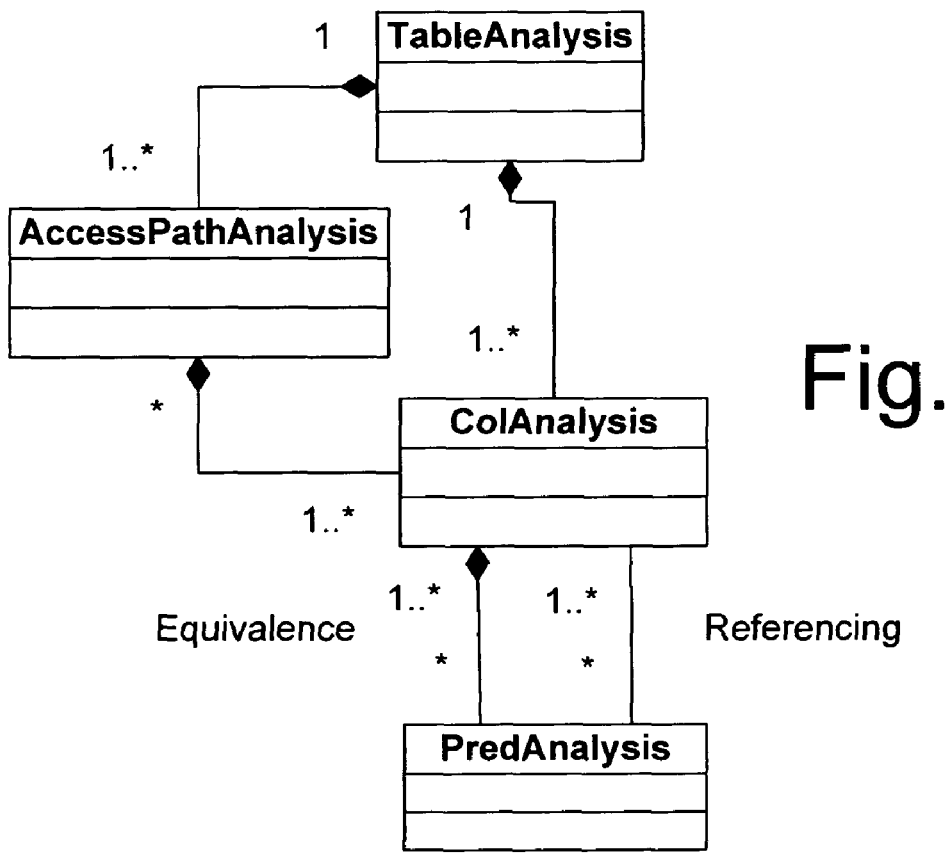
FIG. 5 is a class diagram for table connectivity analysis data structures in accordance with one embodiment.

The class diagram of FIG. 5 shows the relationship between the different Table Connectivity Analysis structures. TableAnalysis, ColAnalysis, PredAnalysis, and AccessPathAnalysis contain analysis results for tables, columns, predicates, and indexes respectively.

Each TableAnalysis has a non-empty set of ColAnalysis objects representing each of the table columns used in the query (either used in a predicate or as part of the select clause). The TableAnalysis has a non-empty set of AccessPathAnalysis members including one for the clustering index. Columns are associated with predicates either via the "Referencing Predicate" relation (RC edge) or the "Equivalence Predicate" relation (EC edge) or both.

To perform Table Connectivity Analysis, the query tree is traversed recursively. For each expression in the tree, the selection predicate is analyzed. For join expressions the join predicate is analyzed as well. The predicates are analyzed by traversing the scalar-expression tree of each predicate looking for base column references. If the predicate is an equality predicate, the method also gathers information about base column members of the equality relationship. The predicate-column associations, as well as resulting column-column associations, are set accordingly. At last, the table-table and table-column connectivity associations are computed based on the column-column connectivity associations.

Multi-Join Rules

The Multi-Join is a logical relational operator that represents a multi-way join between multiple relational operators. The Multi-Join offers a flat canonical representation of an entire join subtree. Unlike regular binary join expressions, the Multi-Join expression can have a variable number of children (joined expressions). The number of children of the Multi-Join can be two or more. The Multi-Join expression contains all the necessary information to create binary join subtrees that are equivalent to the represented multi-way join relations.

Multi-Joins are first created during a Multi-Join Rewrite step prior to the optimization phase. Each left linear join subtree that is associated with a JBB during analysis phase is compacted into a single Multi-Join node with as many children as the JBBCs of that JBB. This new Multi-Join node represents a multi-way join between the JBBC expressions in an equivalent manner to the original join tree.

Figure 6:
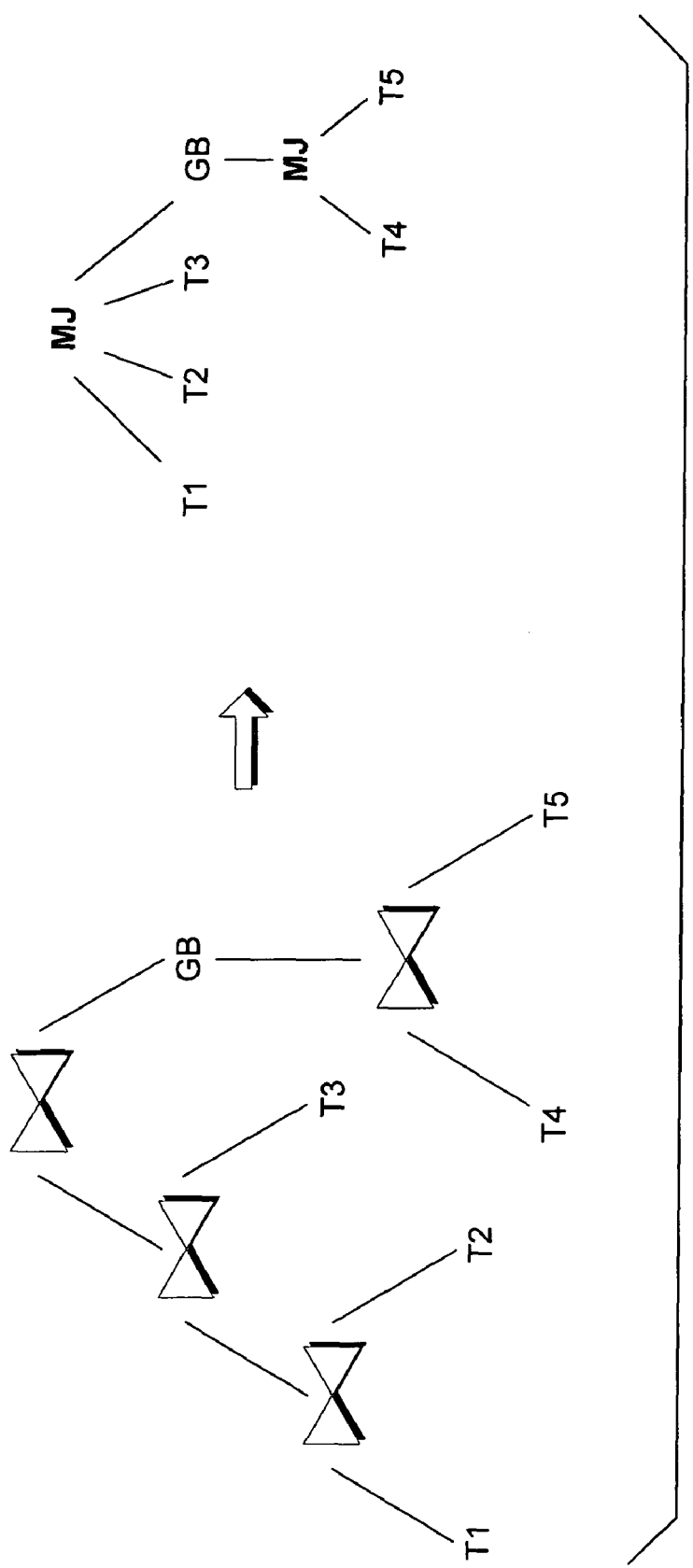
FIG. 6 illustrates an example of multi-join rewrite transformation in a query analyzer in accordance with one embodiment.

FIG. 6 illustrates an example of the application of Multi-Join Rewrite on a query tree. It is then the job of the optimizer's Multi-Join rules to transform and decompress these nodes. As stated earlier, the Multi-Join operator contains all information needed to create expressions equivalent to the original join tree.

Figure 7:
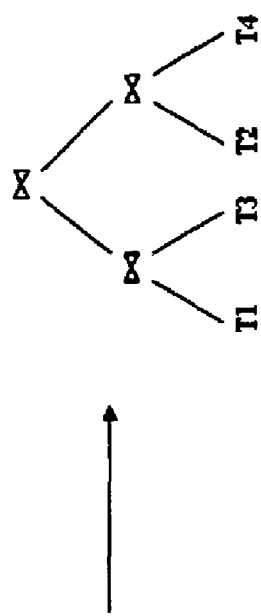
FIG. 7 illustrates an example of a multi-join rule producing a fully specified join tree in accordance with one embodiment.
Figure 7:
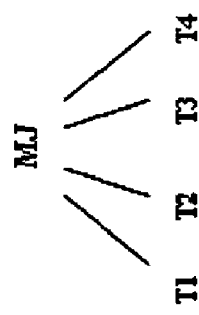
Figure 8:
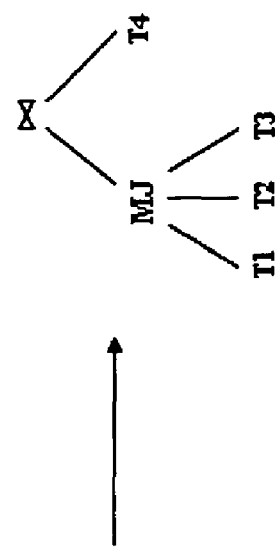
FIG. 8 illustrates an example of a multi-join rule producing a partially specified join tree in accordance with one embodiment.
Figure 8:
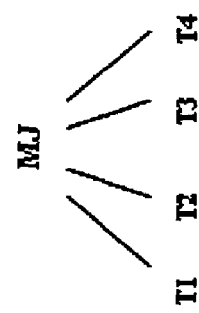

Multi-Join Rules are transformation rules that apply to a Multi-Join expression and generate one or more join subtrees. The generated subtree could have a fully or partially specified join order/shape. In a fully specified join subtree, such as one shown in FIG. 7, all leaves are JBBC expressions (which were children of the original Multi-Join). In a partially specified subtree, one or more leaf is itself a Multi-Join that joins a subset of the original Multi-Join children, an example of which is shown in FIG. 8. Recursive application of Multi-Join Rules result eventually in a set of fully specified join subtrees.

In the illustrated and described embodiment, two Multi-Join Rules are implemented: a MJEnumRule (Multi-Join Enumeration Rule) and a MJPrimeTableRule (Multi-Join Prime Table Rule).

The MJEnumRule is responsible for the enumerating the different join orders of the JBB. Previously this was done via recursive application of LeftShift and JoinCommutivity Rules. These rules are described in U.S. Pat. No. 5,819,255 and referred to therein, respectively, as the "LeftShif rule" and "join commutivity rule".

The MJPrimeTableRule produces good potential order at an early stage in optimization which improves the quality of MINIMUM and MEDIUM optimization levels and enhances the effectiveness of cost-based pruning.

In addition to these two rules, other Multi-Join rules can be utilized. The power of this approach is that it allows using any algorithm for join order optimization. In other words, it allows us to combine the optimizer's top-down architecture with algorithms that are not top-down. Below are several examples of the rules that may be further utilized:

Pattern Specific Rules: Several common JBB schemas, such as the star schema, have well-known promising solutions. These rules could identify such schemas and apply the promising transformation directly. Clearly, such rules require fast identification of the schemas, but this should be facilitated by various components of the query analysis.

Decomposition Rules: Rules that break the JBB into several subsets to be optimized separately. Such rules are valuable in combination with other rules that target the resulting subsets efficiently. For example, the JBB may have a mixture of interesting schemas. Decomposition can then break the JBB into several subsets at which the pattern-specific rules can be applied directly.

Sampling Rules: The use of randomized techniques has been recommended for very large queries. Unlike commutativity and left-shift rules, which allow only for small steps in the search space, new sampling rules operating on the entire JBB can perform large steps in the sampled space. Such steps could improve the sampling process significantly.

Dynamic Programming Rule: Although dynamic programming search is combinatorial in general, it can be used to optimize some interesting schemas within polynomial time (with the help of its own heuristics).

Plain Multi-Join Enumeration Rule

The plain implementation of the Multi-Join Enumeration Rule does a complete exhaustive search of the join order search space without application of any pruning mechanism. The complexity and the outcome of such enumeration are similar to that of the combination of LeftShift and JoinCommutivity Rules, or that of Dynamic Programming algorithm without any pruning heuristic.

Below are presented three varieties of the so-called plain MJEnumRule for three different types of search spaces: Left Linear, Zigzag, and Bushy trees. Bushy search space is the least practical choice for an enumeration rule of any JBB higher than 5-way join, and is mentioned here mostly for completeness. The maximum number of distinct Multi-Joins in a JBB is $(2^n-n-1)$ where n is the number of the JBB Children. The recursive application of a plain MJEnumRule on the top Multi-Join of a JBB will result is the creation of $(2^n-n-2)$ subset Multi-Joins, which would correspond to $(2^n-n-2)$ cascades group. This is the same for any of the three types of the MJEnumRules. They, however, differ in the number of join expressions that each group will have. We will use the total number of join expressions resulting from the recursive application of the MJEnumRule as a metric for the rule logical complexity.

The following notations are used to describe the rules actions.

$$S = \{i_1, i_2, \ldots i_m\}$$
$$= JBBSubset \text{ containing } JBBCs\ i_1, i_2, \ldots i_m$$
$$MJ(S) = \frac{\text{Multi-Join Expression joining}}{\text{the } JBBC \text{ members of } JBBSubset\ S.}$$
$$E(i) = \text{Expression or Cascades Group corresponding to } JBBC\ i.$$
$$EMJ(S) = MJ(S) \quad \text{if } |S| > 1$$
$$= E(i) \quad \text{if } S = \{i\}$$
$$= \text{Undefined if } S = \phi$$

Left Linear MJEnumRule

This rule, when called recursively on the Multi-Joins, enumerates the left linear search space of the join tree. The subsets generated by this rule are joins between one of the JBBCs as a right child and the rest of the JBBCs as a left child Multi-Join. The application of this rule on Multi-Join MJ(S) results in m substitutes where m is the arity of MJ(S); that is, one substitute for each JBBC in S. The rule application on MJ(S) results in the creation of m new MJ(S-i) Multi-Joins to be inserted in Cascades memo. Of course, only the Multi-Joins that are not already inserted in the memo will get inserted.

MJ(S)→Join(EMJ(S−{i}), E(i)) ∀i∈S

The logical complexity of the linear MJEnumRule (represented by the number of join expressions resulting from applying the rule recursively) is $\sim n2^{n-1}$, where n is the number of JBB children. The number of total cascades groups, including those of the JBBCs and the top most Multi-Join, is $2^n-1$. The number of join orders covered by the result join combinations is n!.

Zigzag MJEnumRule

This rule, when called recursively on the Multi-Joins, enumerates the entire zigzag search space of the join tree (including left and right linear trees). The rule is similar to the linear MJEnumRule except that it produces a commutative pair of substitutes for every substitute in the linear rule.

MJ(S)→Join(EMJ(S−{i}), E(i)), Join(E(i), EMJ(S−{i}))
∀i∈S

The logical complexity of the zigzag MJEnumRule is $\sim n2^n$. The number of total cascades groups, including those of the JBBCs and the top most Multi-Join, is $2^n-1$. The number of join orders covered by the result join combinations is $n!2^{n-2}$. Zigzag search space can also be enumerated via the left linear MJEnumRule combined with Join Commutivity rule.

Bushy MJEnumRule

This rule, when called recursively on the Multi-Joins, enumerate the entire bushy search space of the join tree. This is a much larger search space that is a superset of the other two search spaces.

MJ(S)→Join(EMJ(S−I), EMJ(I)) $\forall I \subset S \& I \neq \phi$

The logical complexity of the bushy MJEnumRule is $\sim 3^n$. The number of total cascades groups, including those of the JBBCs and the top most Multi-Join, is $2^n-1$. The number of join orders covered by the result join combinations is $(2n-2)!/(n-1)!$.

MJEnumRule and LeftShiftRule

The plain implementation of the MJEnumRule has similar complexity to the plain JoinCommutivity and LeftShift rules (which we will refer to as the join enumeration rules). The main advantage of the MJEnumRule is that it offers a better scheme for join order traversing and pruning. Fine control over search space traversing and the enabling of logical expression pruning are essential features in a good enumeration scheme.

The main problem with join enumeration rules is the limited scope to which they apply. The binding of LeftShiftRule is only two levels deep in the join tree. This limits what the rule can do, and makes it dependent on other rules invocations. In order for LeftShiftRule to work properly, an ExploreGroupTask (described in U.S. Pat. No. 5,819,255) for the left child group is scheduled ahead of the rule. This is done in order to ensure the LeftShiftRule finds all its bindings and considers all of its potential substitutes. The ExploreGroupTask on the child group translates into ExploreExprTasks (also described in U.S. Pat. No. 5,819,255) on all expressions in the group including any join node in the group. Now again, when exploring such join, an ExploreGroupTask for the join left child is scheduled ahead of LeftShiftRule of the join. As a result, LeftShiftRule is propagated all the way down the join tree until the pattern is not found (bottom of join tree) or the rule has been already applied (or marked as applied) to all join expressions in the group. In the case of the bottom most join node in the tree, a JoinCommutivityRule is scheduled.

The application of the MJEnumRule on a Multi-Join MJ(S) does not depend on a rule application on any of MJ(S) siblings or children. MJEnumRules do not require any exploration from its children since they have all the information needed to generate all potential substitutes. This is a fundamental difference from the LeftShiftRule which requires the join enumeration rules to have successfully completed on the join left child and down recursively. Although this difference has no significance for the plain implementation of the rules, it becomes very significant when pruning is considered. MJEnumRule can prune large chunks of the logical search space without the need for expensive exploration of the children. In a way Multi-Join rules allow for more breadth in our depth-first-search-like traversing of the query tree. This is because pruning decisions could be made at higher levels in the tree without the need to explore or optimize much of the query subtree.

Because of the strong dependency between the different invocations of join enumeration rules, pruning the result of any enumeration rule may have undesired consequences. The invocation of an enumeration rule on a certain join expression has impacts on the creation of another sibling or kin joins by another rule later. Suppose that based on lower bound pruning or heuristic pruning we decided to prune the result of a certain join enumeration rule. Since other enumeration rules applying to parent join expressions assume the exploration of that group, we cannot discard that 'pruned' result. In theory, we may even need to explore it in order to ensure the parent join rules fire properly (In this particular case, exploration is usually not needed due to our compact implementation of the join enumeration rules).

In order to demonstrate the difference between the way MJEnumRule and join enumeration rules work, we show below how each rule set works on a simple 4-way join query, without any pruning. We follow that with an exercise that shows the difficulty in pruning join enumeration rules in comparison to MJEnumRule. Now, consider the following query:

select T1.a from T1, T2, T3, T4 where T1.b=T2.a and T2.b=T3.a and T3.b=T4.a;

This query has one JBB joining T1, T2, T3, and T4. Let JBBCs 1, 2, 3, and 4 be assigned to T1, T2, T3, and T4 scan nodes, respectively. Initially one Multi-Join expression MJ(1,2,3,4) will be inserted into the cascades memo, in addition to all its children expressions. The MJEnumRule will then fire on this Multi-Join producing three other child Multi-Joins, to which the rules will be recursively applied. The sequence of MJEnumRule firing, and the expressions (substitutes) it produces are shown below. In addition, new groups inserted at the invocation of each rule are shown. The notation [i,j,k] is used to represent a cascades group that has the JBBSubset value {i,j,k}.

Initial groups: [1,2,3,4]+root+JBBCs
MJ(1,2,3,4)==>J(MJ(1,2,3),4); J(MJ(1,2,4),3) J(MJ(1,3,4),2); J(MJ(2,3,4),1)
　　New groups: [1,2,3]; [1,2,4] [1,3,4]; [2,3,4]
MJ(1,2,3)==>J(MJ(1,2),3); J(MJ(1,3),2) J(MJ(2,3),1)
　　New groups: [1,2]; [1,3]; [2,3]
MJ(1,2)==>J(1,2); J(2,1)
MJ(1,3)==>J(1,3); J(3,1)
MJ(2,3)==>J(2,3); J(3,2)
MJ(1,2,4)==>J(MJ(1,2),4); J(MJ(1,4),2) J(MJ(2,4),1)
　　New groups: [1,4]; [2,4]
MJ(1,4)==>J(1,4); J(4,1)
MJ(2,4)==>J(2,4); J(4,2)
MJ(1,3,4)==>J(MJ(1,3),4); J(MJ(1,4),3); J(MJ(3,4),1)
　　New groups: [3,4]
MJ(3,4)==>J(3,4); J(4,3)
MJ(2,3,4)==>J(MJ(2,3),4); J(MJ(2,4),3); J(MJ(3,4),2)

Now consider the case when we insert the expression tree as a join tree (instead of a Multi-Join) and traverse the search space via the invocation of the LeftShift and JoinCommutivity rules. In this case we are starting with the join tree J(J(J(1,2),3),4) memoized. Before invoking the LeftShiftRule on the top most join, Cascades schedules an ExploreGroupTask for the left child join group to be performed ahead of the LeftShifRule application. This is necessary so the LeftShifRule can find all its bindings. While exploring this second join expression, Cascades also schedules an ExploreGroupTask ahead of LeftShiftRule for that join. As a result, the first enumeration rule that gets fired is the JoinCommutivityRule on the lowest join node in the tree J(1,2). The sequence of JoinCommutivityRule and LeftShiftRule firing, and the substitutes and new groups they produce, are shown below.

Initial groups: [1,2,3,4]; [1,2,3]; [1,2]+root+JBBCs
J(1,2)==>J(2,1)
J([1,2],3)==>J(J(1,3),2); J(J(2,3),1)
　　New groups: [1,3]; [2,3]
J([1,2,3],4)==>J(J([1,2],4),3); J(J([1,3],4),2); J(J([2,3],4),1)
　　New groups: [1,2,4]; [1,3,4], [2,3,4]
J(1,3)==>J(3,1)
J(2,3)==>J(3,2)
J([1,2],4)==>J(J(1,4),2); J(J(2,4),1)

Figure 9:
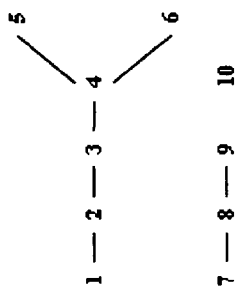
FIG. 9 illustrates an example of a join connectivity graph in accordance with one embodiment.

New groups: [1,4]; [2,4]
J(1,4)==>J(4,1)
J(2,4)==>J(4,2)
J([1,3],4)==>J(J(1,4),3); J(J(3,4),1)
 New groups: [3,4]
J(3,4)==>J(4,3)
J([2,3],4)==>J(J(2,4),3); J(J(3,4),2)
 In the 4-way join example above, assume we want to prune J(2,1) from the search space. This could be because we found that J(1,2) will be always superior to J(2, 1). Assume you can prune by discarding the substitute completely and not inserting it into memo.
  Show how this pruning could be done in the case MJEnumRule. Do this by marking the pruned expressions. Also, make sure to mark expressions that depend on them and make any necessary change/addition as a result of the pruning.
  Show how this could be done in the case of the LeftShift+JoinCommutativity rules. You can choose either of the two scenario shown above for LeftShift+JoinCommutativity.
  Mark all expressions and groups that will be indirectly pruned for both cases.
  What happened to J(2,3) and J(2,4) in both cases. Was this pruning intended?
Apply the same exercise above for pruning join between groups [1,3] and [2],i.e., J([1,3], 2).
Apply the same exercise above for pruning all expressions except for J(J(J(4, 3),2,)1).
 The example above shows that discarding results of the LeftShiftRule (or JoinCommutivityRule) leads to the indirect pruning of other join expressions. These are expressions that are not related to the rule itself, except through exploration dependencies. To avoid this scenario we do not discard join enumeration rules substitutes when we decide to 'prune' them in the current compiler. Instead, we only mark the 'pruned' substitute not to be implemented. Although this saves the major time of optimizing this substitute, we pay additional cost of exploring a pruned subtree. This is a small cost in the example above, but when we use effective pruning mechanisms on complex queries, this exploration cost become the major optimization cost (based on experimental results of 10 to 16 way joins). This is an important conclusion because optimizing complex queries above 8-way joins relies heavily on effective pruning mechanisms that prune the extreme majority of the search space.
 Using the MJEnumRules offer better control over the search space traversing and the ability of pruning (discarding) of logical expressions. The rule has no exploration dependency on other rules, which enable us to make pruning decisions early without the need to go all the way down the tree.
 Plain enumeration rules have at least exponential logical complexity, which makes them impractical for very large queries. Plain linear and zigzag rules have serious performance limitations beyond 6 way joins while plain bushy enumeration is impractical beyond 5-way joins. In order to push the limit of applicability of such rules, heuristic pruning is used to reduce the number of substitutes and consequently reduce the rule's complexity. Heuristic pruning benefits considerably from the Multi-Join and Multi-Join rules features described earlier. In the following section, we will present a heuristic that is added to the MJEnumRule.
 Cross Product Control
 The cross product control heuristic eliminates non-mandatory cross products from the plan search space. A cross product between JBBItem1 and JBBItem2 is considered mandatory if there exists no direct or indirect join connection between the two JBBItems (a JBBItem is a JBBC or JBBSubset). The number of mandatory cross products in a join backbone is equal to the number of disjunct subgraphs in that JBB connectivity graph minus one. If there is m mandatory cross products in a JBB, then any join order generated from that JBB will have at least m cross products.
 The cross product control is implemented in the MJEnumRule as follows. The number of disjunct subgraphs is computed for both original Multi-Join (binding) and the substitute's child Multi-Join. The potential substitute is eliminated from the list of final substitutes under following condition: The substitute child Multi-Join, MJ(S-i), has more disjunct subgraphs than the binding Multi-Join, MJ(S).
 If this condition applies, then we discard the substitute because the output Multi-Join is certain to have non-mandatory cross product, i.e. any join tree that results from transforming that Multi-Join will have a non-mandatory cross product. Take for example the join connectivity graph for JBBSubset S={1,2,3,4,5,6,7,8,9,10} shown in FIG. 9. The graph has three disjunct subgraphs {1,2,3,4,5,6}, {7,8,9}, and {10}. The above condition states that applying the MJEnumRule should not result in disconnecting any of the connected subgraphs.
 Let DSG(S) be the number of disjunct subgraphs in JBBSubset S. There are three possible cases that may result from applying the MJEnumRule
MJ(S)==>J(MJ(S-i),E(i)).
  Case 1: DSG(S)<DSG(S-i)
  In this case substitute J(MJ(S-i),E(i)) will be pruned since MJ(S-i) has a non-mandatory cross product. For example, i=2, 3, 4, or 8 in the graph above.
  Case 2: DSG(S)=DSG(S-i)
  No pruning is performed in this case. Note that J(MJ(S-i), E(i)) is guaranteed not to be a cross product at this point (if the join was a cross product then i should be a disjunct subgraph by itself which implies that DSG(S-i)=DSG(S)−1). Hence, there are no additional cross products introduced by this transformation. Examples of this case are i=1, 5, 6, 7, or 9 in the graph above.
  Case 3: DSG(S)>DSG(S-i), or more precisely DSG(S)= DSG(S-i)+1
  No pruning is performed in this case. This could only happen if J(MJ(S-i),E(i)) is a mandatory cross product, i.e i was in a disjunct subgraph by itself. As in case 2, there are no non-mandatory cross products introduced by this transformation. For example, i=10 in the graph above.

EXAMPLE select t1.a from t1, t2, t3, t4 where t1.b=t2.a and t2.b=t3.a and t3.b=t4.a;
 This query has only one JBB of the following join connectivity
 1---2---3---4
The steps below show the sequence of MJEnumRule firing with cross product control. Comparing this sequence with that of the plain MJEnumRule shows the significant reduction due to cross product control.
MJ(1,2,3,4)==>J(MJ(1,2,3),4); J(MJ(2,3,4),1)
 New groups: [1,2,3]; [2,3,4]
MJ(1,2,3)==>J(MJ(1,2),3); J(MJ(2,3),1)
 New groups: [1,3]; [2,3]
MJ(1,2)==>J(1,2); J(2,1)
MJ(2,3)==>J(2,3); J(3,2)
MJ(2,3,4)==>J(MJ(2,3),4); J(MJ(3,4),2)
 New groups: [3,4]
MJ(3,4)==>J(3,4); J(4,3)
 Cross Product control can reduce the logical complexity of the MJEnumRule considerably, depending on the join schema. In the best-case scenario, linear schema complexity is reduced from exponential to quadratic. For example, the complexity of a 12-way join linear schema is reduced from ~24,000 to ~140 (that's over 99% reduction). In the worstcase scenario, the complexity of fully connected schema is unaffected. For the general case, the effect on a query compile time varies depending on the number and arrangement of the join connections.

Mandatory cross products themselves can be eliminated from most JBBs. Basically, the JBB containing multiple disjunct JBBSubsets is decomposed into a cross product backbone that joins (cross-products) each of the disjunct subsets. The result is a new JBB (the cross product backbone) as well as new a JBB for every disjunct JBBSubset in the previous JBB. In other words, the mandatory cross products are pulled up to the cross product backbone leaving other JBBs free of mandatory cross products. A special cross-product-reorder rule is then fired on the cross product Multi-Join to order the children in order of their row count, which minimizes the total cost of the cross products.

Combining Selective and Exhaustive Schemes

One of the motivating goals in the initial development of the SQL/MX optimizer was the ability to handle highly complex DSS queries, as mentioned above. The current optimizer uses exhaustive enumeration, along with aggressive pruning techniques (e.g. random pruning) to avoid search space explosion and ensure the compilation of large complex queries.

Exhaustive optimization operates by enumerating a large number of possible plans, thereby increasing the chance of obtaining the optimal plan. Even though complete exhaustive enumeration can lead to an optimal plan, the enumerated search space grows exponentially with query complexity. To control the search space explosion and ensure query compilation within time and memory constraints, the optimizer applies aggressive pruning techniques beyond a certain threshold of complexity. During optimization of a complex query the rate of aggressive pruning increases rapidly to counter the exponential growth in search space. The application of such techniques leads to deterioration in plan quality as query complexity increases.

Most exhaustive optimization schemes are limited to the left linear (or zigzag) search space. This is due to the huge increase in the size of the bushy search space as the number of joined tables increase. Even in comparison to exhaustive left linear search space, the bushy search space is extremely large. Generating bushy plans using exhaustive schemes becomes a practical impossibility beyond handful number of joined tables. An alternative scheme that permits feasible enumeration of bushy plans is the selective optimization approach. Selective optimization generates a small number of promising query plans using intelligent informed algorithms. The generated plans could have linear, zigzag, or bushy join tree shape, depending on the optimization algorithm.

Since selective optimization generates a small number of promising plans, it requires much less time and lower resource consumption in comparison to exhaustive optimization. A major drawback of enumerating a limited number of plans is the higher chance of missing the optimal plan. However, it should be noted, that the plan quality degrades at a much lower rate with increasing query complexity as compared to exhaustive optimization. The quality of plans generated and the rate of plan quality degradation depend on the heuristics used by the algorithm.

Figure 10:
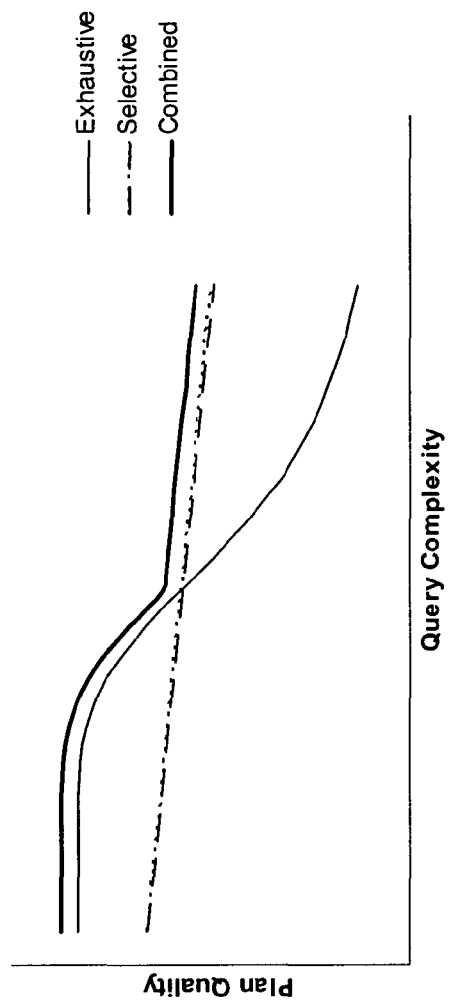
FIG. 10 illustrates a graph that compares exhaustive optimization with selective optimization.

FIG. 10 demonstrates the general behavior of exhaustive optimization (with aggressive pruning) and selective optimization as query complexity increases.

Combining the Two Approaches

Combining exhaustive and selective optimization schemes gives us the best of both worlds. When the query complexity is low, exhaustive enumeration is completed and the optimal plan (with the exhaustive search space) is chosen. When the complexity is high, intelligent plans generated using the selective approach are chosen.

Using Multi-Join rules enables us to perform intelligent selective enumeration. Improved plan quality can, therefore, be achieved by combining exhaustive and selective optimization approaches. The Multi-Join Prime Table Rule (discussed below) performs an intelligent selective enumeration. The rule fits into an enhanced scheme (discussed below) that works to efficiently combine exhaustive and selective optimization approaches within the top down rule based optimizer, to ensure improved plan quality for large complex queries. It is also important to note that plan quality improves not only for large complex queries but for some of the smaller queries as well, because the selective scheme can enumerate plans in the bushy search space which is not enumerated by the exhaustive scheme.

Figure 11:
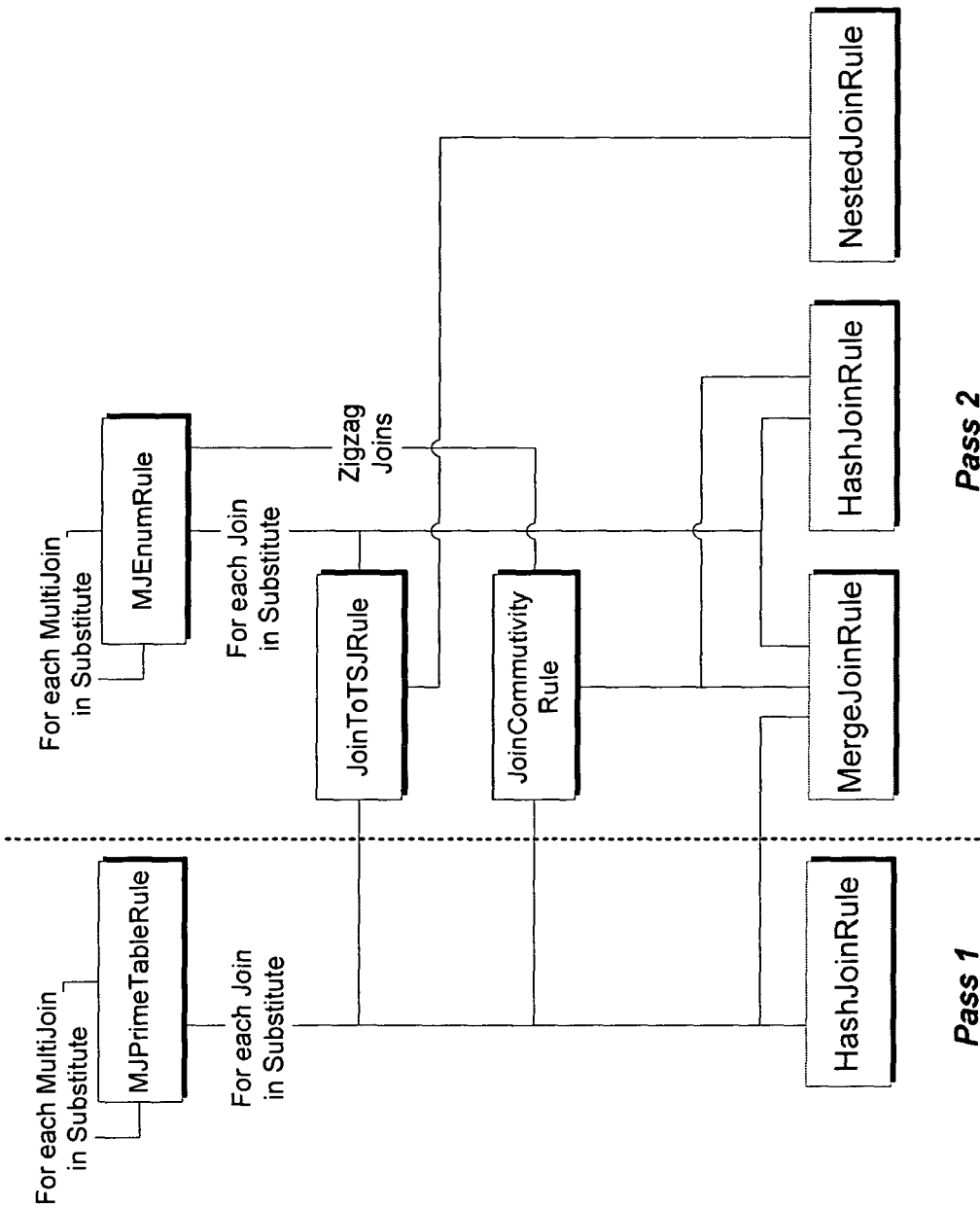
FIG. 11 illustrates rule scheduling in a SQL/MX two-pass optimizer in accordance with one embodiment.

FIG. 11 shows the rule scheduling diagram after the introduction of the Multi-Join Rules. The Multi-Join Enumeration Rule (MJEnumRule) implements the exhaustive enumeration scheme, as described above. In the overall picture, MJEnumRule is the last Multi-Join rule to be fired. The MJEnumRule's substitutes constitute the bulk of the join expressions in the memo. The Multi-Join PrimeTable Rule (MJPrimeTableRule) fires earlier (in pass 1) producing limited number of promising join shapes. To cover more promising variations of the shape it generates, the MJPrimeTableRule schedules Join-CommutivityRule on its substitutes. As a result, early in the second pass we try different variations of the original MJPrimeTableRule output shape, implemented with the rich alternatives of the second pass implementation rules. The MJPrimeTableRule marks the expressions it produces as being produced by the MJPrimeTable rule, which allows us to give preferential treatment to these expressions in pass 2. The marked expressions are optimized in pass 2 before any other enumeration takes place (i.e. before the firing of the first MJEnumRule). By doing this we secure full implementation of some of the promising join orders as early as possible.

Multi-Join Prime Table Rule

The Multi-Join Prime Table rule (MJPrimeTableRule) is a multi-join rule (i.e. a rule that operates on a Multi-Join expression) and produces a join tree. The MJPrimeTableRule operates based on a primary objective of minimizing the dataflow (i.e. number of rows) going into the Prime Table (the largest table after application of local predicates), hence the name Multi-Join PrimeTable rule. The goal of the MJPrimeTableRule's algorithm is to minimize the data flow in the result join tree and reduce the cost of accessing the largest table (i.e. the Prime Table) in the tree. The rule is a pass 1 rule, but it schedules Join Commutativity on pass 2 which generates large number of zigzag variations of the result tree.

The MJPrimeTableRule produces good potential join order at an early stage in optimization which improves the quality of MINIMUM and MEDIUM optimization levels and enhances the effectiveness of cost-based pruning.

Figure 12:
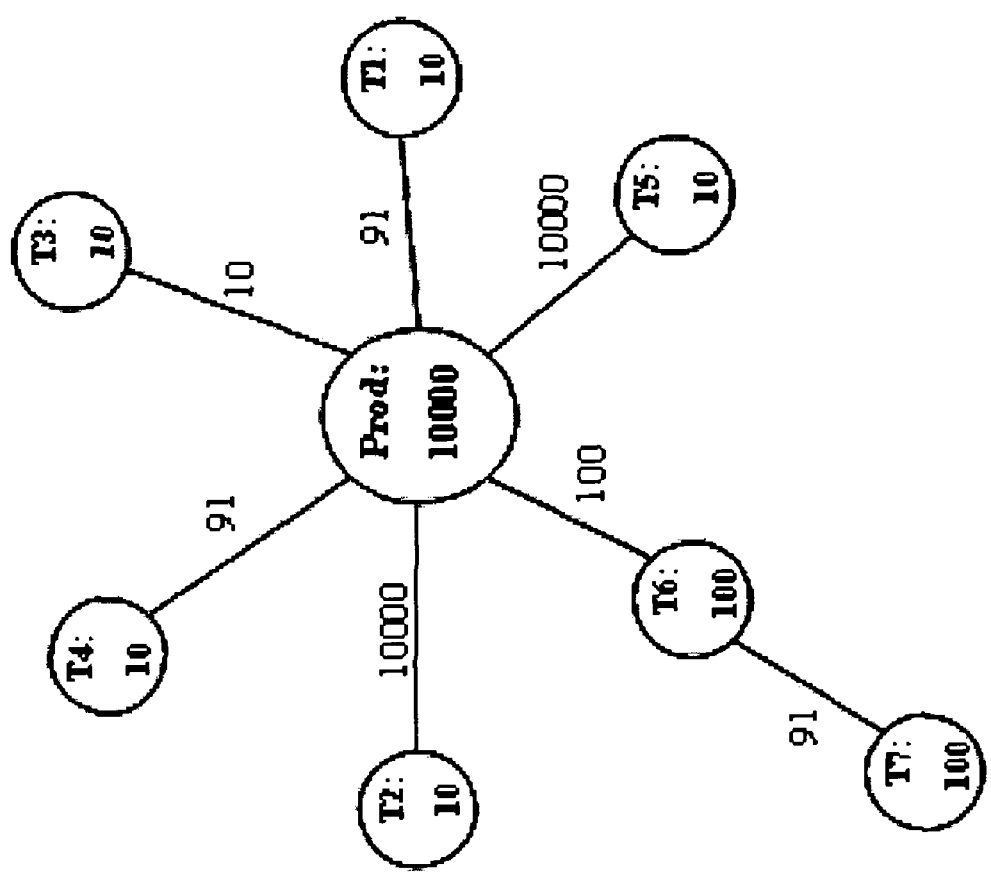
FIG. 12 illustrates a star schema that is utilized as an example.
Figure 13:
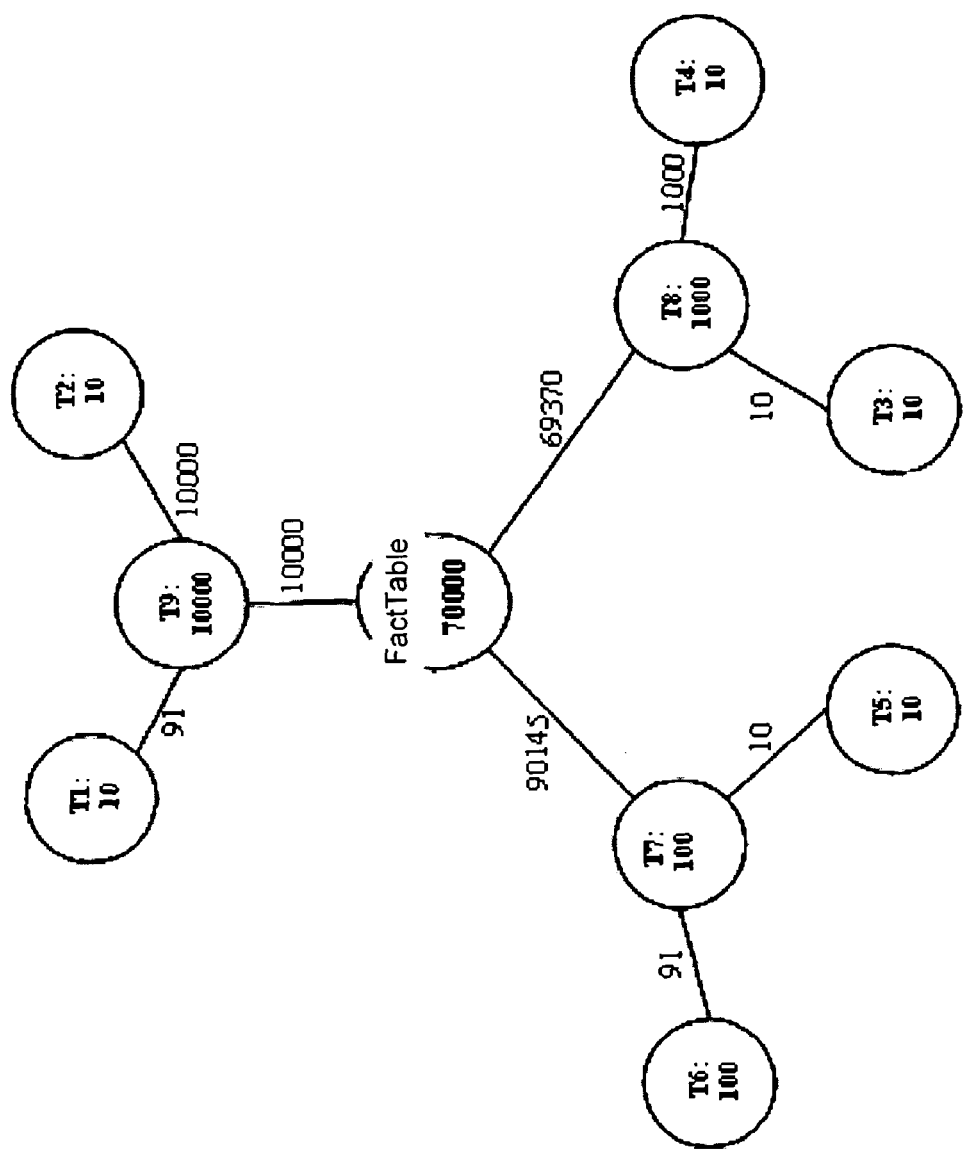
FIG. 13 illustrates a snowflake schema that is utilized as an example.

To illustrate the working of the MJPrimeTableRule we will use Star/Snowflake schemas. The reason for using Star/Snowflake schemas is that they present scenarios in which there is a clear Prime Table, making it easier to explain and understand. FIG. 12 illustrates a star schema and FIG. 13 illustrates a snowflake schema that we will use to explain the working of the MJPrimeTableRule.

Please note that from this point onward, any time we speak about cardinality we are referring to the after local predicate cardinality, unless otherwise mentioned.

The following is step-by-step description of how the MJPrimeTableRule works:

First Step

First, sort all the JBBCs (all the JBBCs in the multi-join on which this rule is being applied) by their after local predicate cardinality. The JBBC with the largest cardinality is the prime-table (in FIG. 12 primetable is PROD, in FIG. 13 primetable is FactTable).

At this point the multi-join has been logically broken up into {primetable and availableNodes}. Here available nodes are all nodes but the prime table Second Step Next, create an availableNodes set which includes all the JBBCs in the multi-join. Remove the prime-table from the availableNodes set.

Third Step

Compute the fringes (refer to the section titled "Fringes" below for an explanation of this term) of the prime-table. This is done by iterating over the JBBCs connected to the prime table in order of descending cardinality of the connected JBBCs. Start a fringe from each JBBC connected to the primetable. The rationale for this is that we want to reduce the larger nodes first. Hence, for Each fringe:

If fringe reduces the prime table, insert fringe into list of reducing fringes. Remove the nodes that participate in the fringe from the availableNodes set so that any subsequent fringes don't use the same nodes (in case fringes are connected).

If fringe does not reduce the prime table, and only increases the cardinality of the prime table say by 5% or less, then add the fringe to the list of non-reducing fringes. Remove the nodes that participate in the fringe from the availableNodes set so that any subsequent fringes don't use the same nodes (in case fringes are connected).

If fringe increases the cardinality of the prime table by more than 5% don't consider it. Basically don't remove the nodes that constitute the fringe from the availableNodes.

Figure 14:
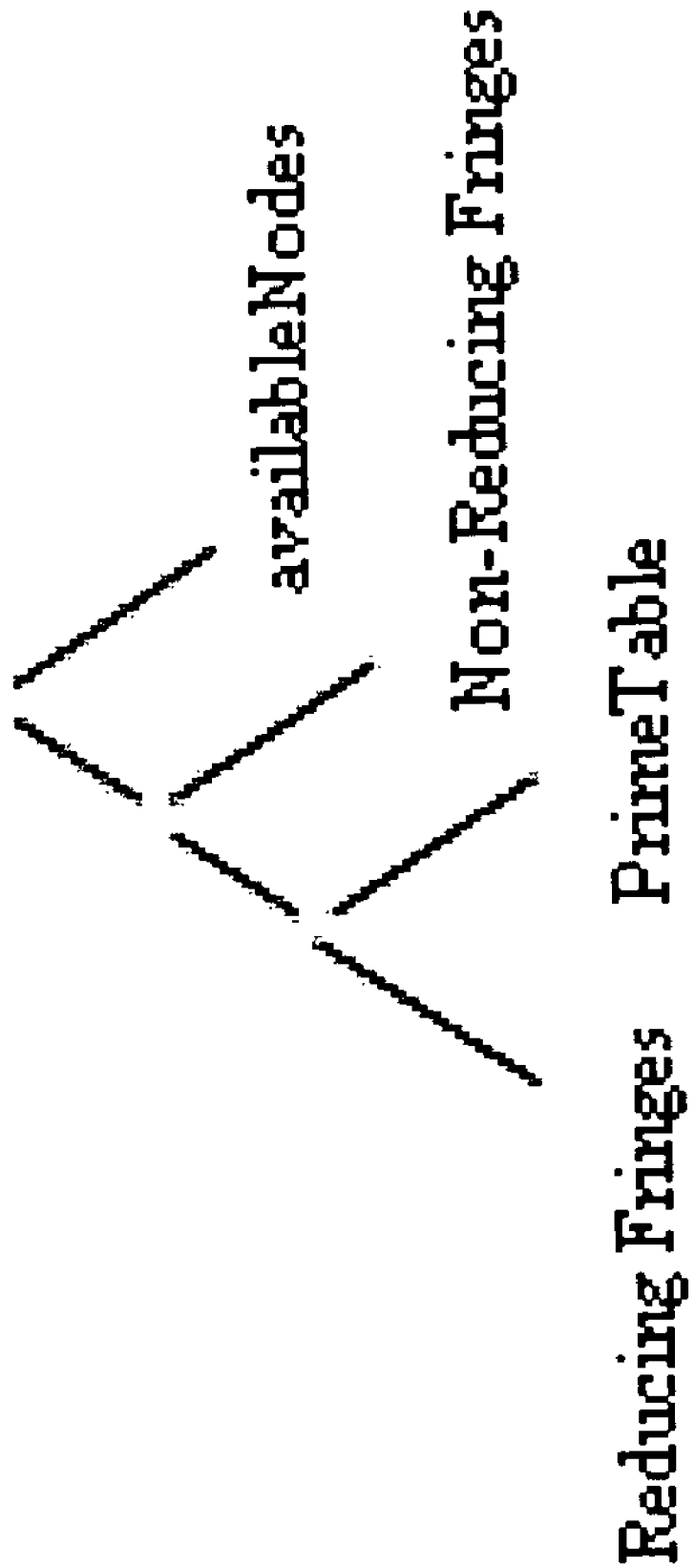
FIG. 14 illustrates a logical query tree in accordance with one embodiment.

At this point the multi-join has been logically broken up into {available nodes, non-reducing fringes, primetable, reducing fringes}. Logically, the query tree looks as represented in FIG. 14.

Here available nodes are all nodes excluding the fringes and the prime-table. Each non-reducing fringe will be joined as a multi-join above the primetable. Below we will figure out which of the reducing fringes will be below the primetable and which of them will be above the primetable.

Fourth Step

Next, sort the list of reducing fringes in ascending order. Fringes are sorted based on the dataflow they generate when joined to the prime table. We assume a nested join of the fringe with the primetable as inner, under such an assumption the dataflow is determined as:

Cardinality(fringe)+Cardinality(fringe join primetable)

This sorted list determines the sequence in which the reducing fringes will be joined. The first element of the list will be the first element joined (first from bottom of the join tree). For right now also assume that all these reducing fringes will be below the primetable in the join tree. The query tree logically still looks as represented in FIG. 14.

Fifth Step

Now, determine the best position for the primetable in the list of sorted reducing fringes. The join order (i.e. the sequence in which these fringes will be joined) of these fringes was already set in the fourth step above. Iterate over the sorted list of reducing fringes. In each iteration, measure the dataflow in the join tree constituted by the reducing fringes and the primetable. In each iteration, place the primetable after the i'th (where i is the variable used for iteration) element in the list. Dataflow is measured as the sum of cardinality of the outer most joined element and cardinalities of each successive join.

As an example consider there are 3 reducing fringes, and in sorted order they are fringe1, fringe2, fringe3. We will try placing the primetable after each one of these fringes, so we will try join sequences:

1. fringe1, primetable, fringe2, fringe3
2. fringe1, fringe2, primetable, fringe3
3. fringe1, fringe2, fringe3, primetable We will pick the location of the primetable that causes the minimum dataflow. In doing so, we have cut up the sorted list of reducing fringes in two lists: a list of reducing fringes above the prime table, and a list of reducing fringes below the prime table.

At this point we have almost completely figured out the join sequence for the substitute this rule will produce. Going from top to bottom, in a left deep manner, the join sequence is:

availableNodes as multi-join. availableNodes are all JBBCs excluding the primetable and the JBBCs participating in fringes. This set will be further broken down in the following step (Sixth Step below);

non-reducing fringes each as a multi-join;

Reducing fringes above the prime table;

Prime Table; and

Reducing fringes below the prime table.

Figure 15:
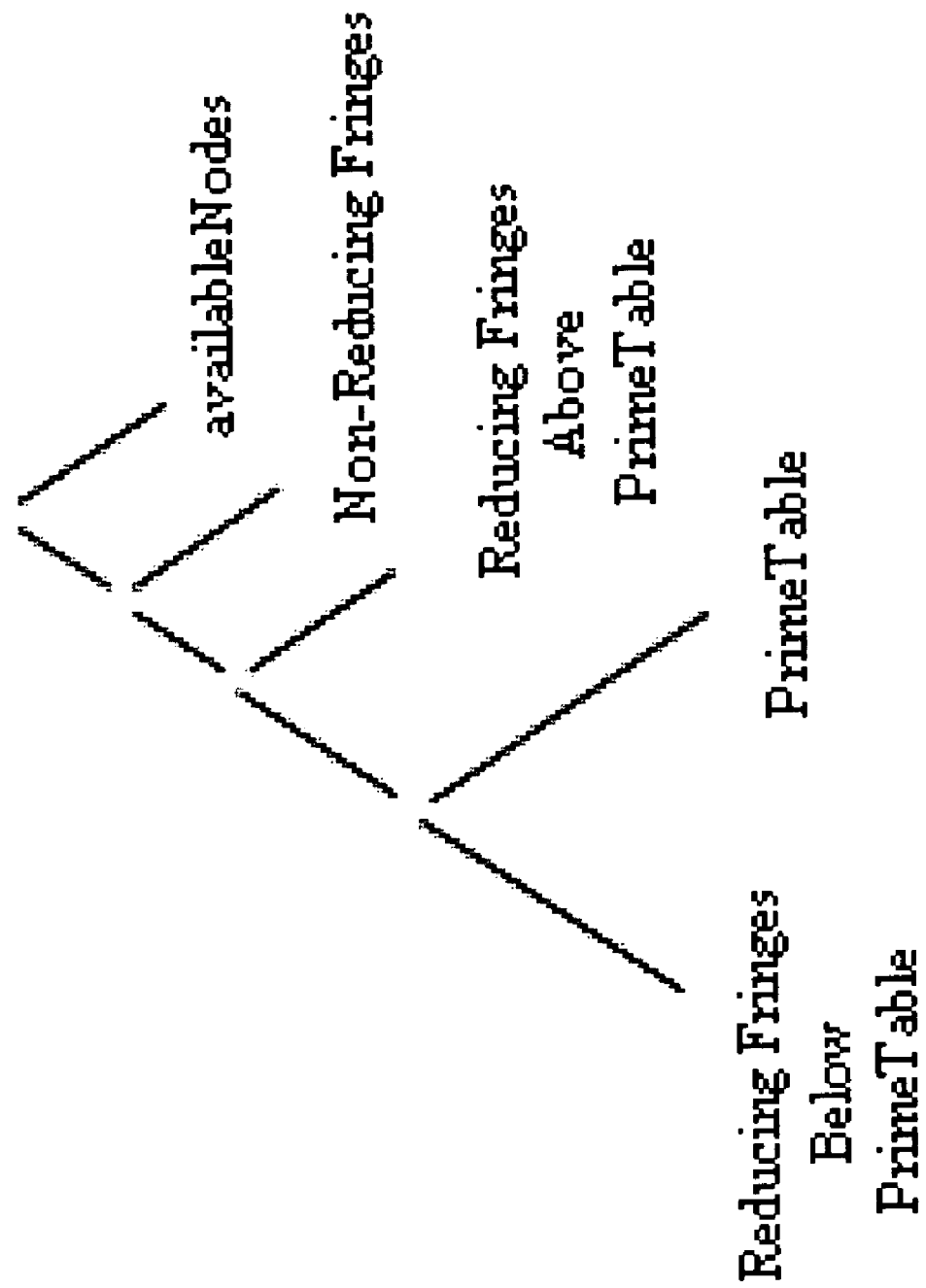
FIG. 15 illustrates a logical query tree in accordance with one embodiment.

Now the query tree logically looks as represented in FIG. 15.

Sixth Step

Now, break up the set of JBBCs in the availableNodes based on the following:

Get a list of the connected subgraphs constituted by nodes in the availableNodes set.

Sort the above mentioned list in ascending order based on a sort metric. The sort metric for a subgraph is defined as:

sortMetric cardinality (subgraph join nonAvailableNodes)/ cardinality (subgraph)

Here nonAvailableNodes are all nodes that are not in the availableNodes set (i.e. all nodes in the fringes+the primetable).

A left deep join sequence of the sorted list of subgraphs will replace the available nodes in the tree displayed above.

Figure 16:
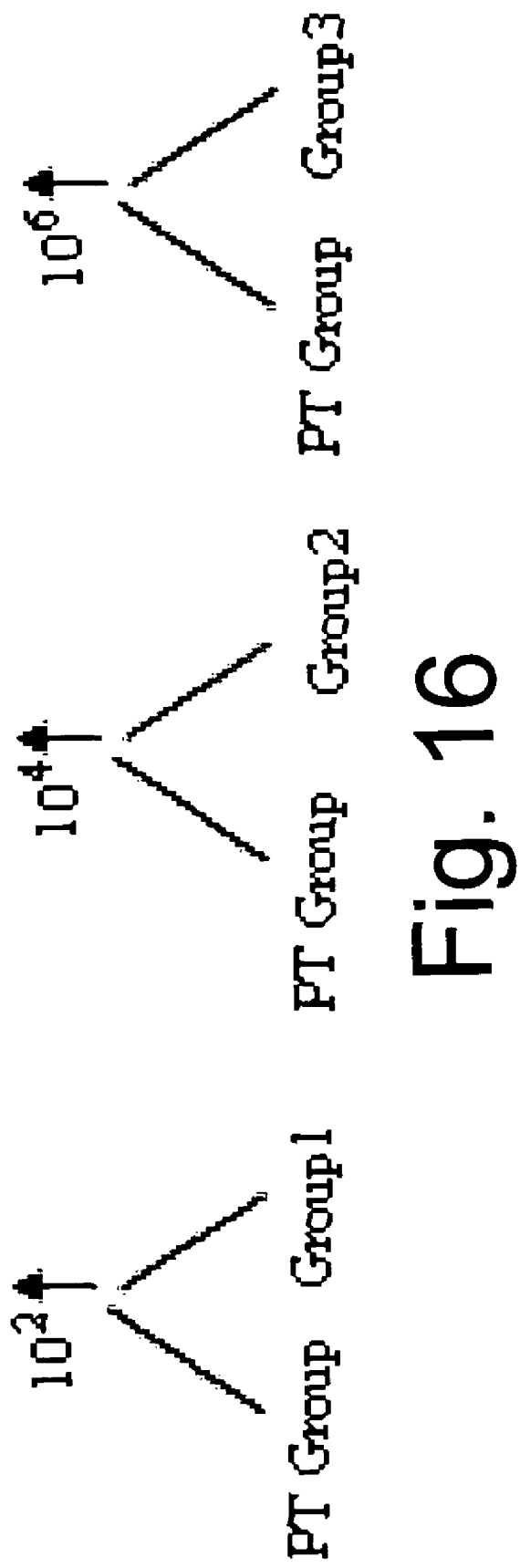
FIG. 16 illustrates a PT group in accordance with one embodiment.

This is a heuristic to minimize dataflow through the availableNodes set, and can be mathematically proven. However, for simplicity sake we will illustrate it as follows:

Assume subgraphs Group1, Group2 and Group3 constitute the availableNodes set. Let PT Group denote the nonAvailableNodes (calling it PT Group, since it includes the Prime Table), i.e. the group of tables not in the availableNodes set. FIG. 16 represents the cardinality estimates for join of each subgraph (Group1, Group2 and Group3) with the PT group.

It should also be noted that none of the groups (i.e. Group1, Group2 and Group 3) are joined to one another, which means Group1 join Group2 join Group3 would constitute a cross product backbone. Each of the Groups in most cases would be joined to the PT Group.

Figure 17:
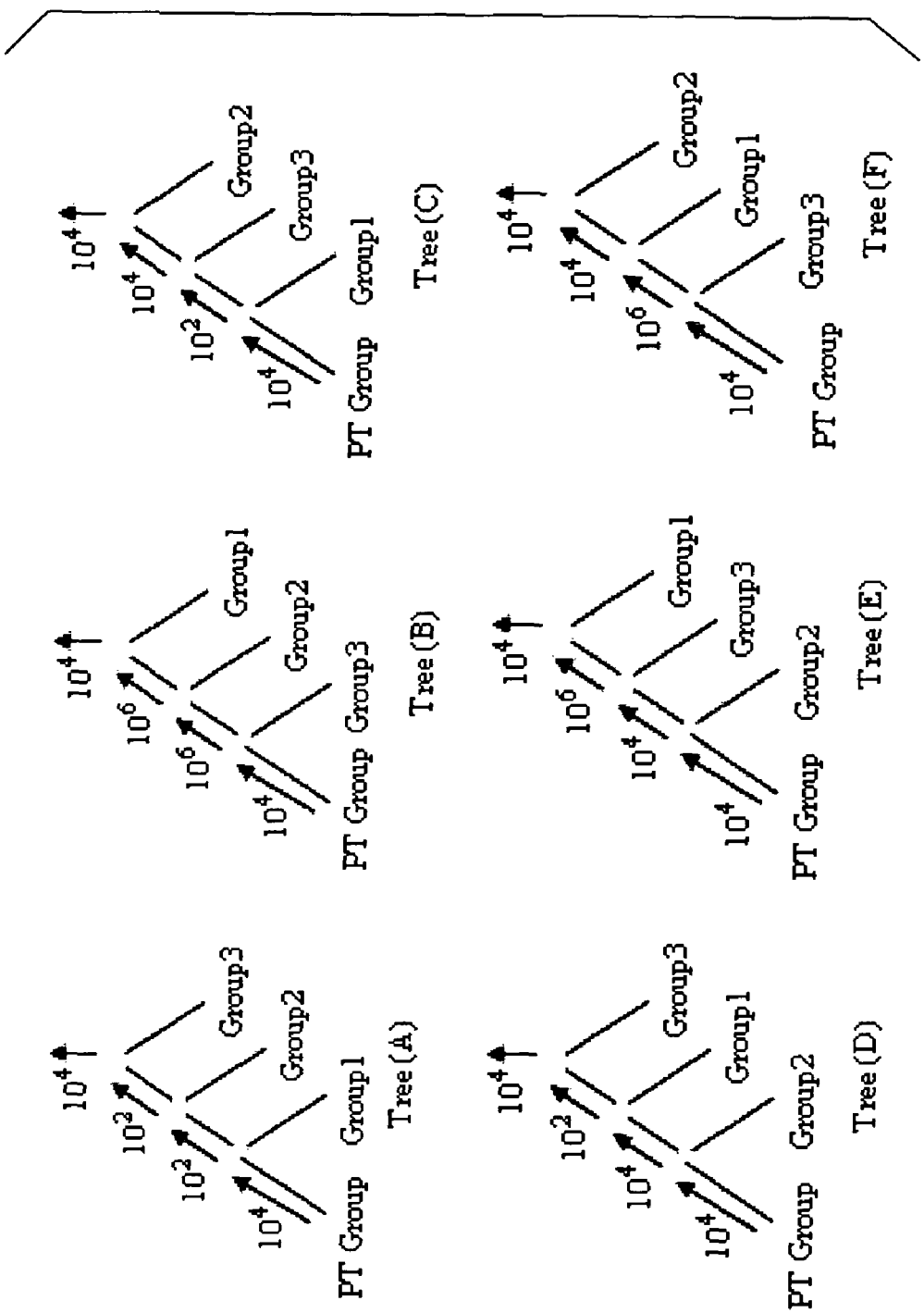
FIG. 17 illustrates exemplary query trees in accordance with one embodiment.

Based on the information above, we get the query trees as shown in FIG. 17 for the join of Group1, Group2, Group3 and PT Group. This figure shows that the best dataflow is achieved when the groups are joined to the PT Group in order of increasing cardinality of each group's join with the PT Group (Tree A).

As an important note, consider the following. The MJPrimeTableRule schedules the application of the join commutativity rule on each of the join nodes in the join tree that it produces. This is done so as to allow the enumeration of the different zigzag variations of the join tree produced by the MJPrimeTableRule in optimization pass 2. The MJPrimeTableRule also marks each of the join nodes as having been produced by the MJPrimeTableRule; this is used to give the join nodes preferential treatment during optimization pass 2. Preferential treatment means that in pass 2 we optimize expressions produced by the MJPrimeTableRule before any other expressions, which results in getting a relatively good plan at an earlier stage in pass 2 (earlier than without the use of MJPrimeTableRule). Getting a good plan earlier is desirable because it provides us a fall-back plan in case some aggressive pruning kicks in. Aggressive pruning techniques (e.g. random pruning, which is used during optimization level 3) are used to avoid search space explosion and ensure that a plan is obtained.

Examples of MJPrimeTableRule Application

Let's follow the application of the MJPrimeTableRule using the star schema of FIG. 12.

The "First Step" produces a sorted list of JBBCs [PROD, T7, T6, T5, T4, T3, T2, T1]. From this list we figure out PROD to be the primetable.

The "Second Step" gives an availableNodes set {T1, T2, T3, T4, T5, T6, T7}.

The "Third Step" gives fringes categorized in reducing and non-reducing fringes as follows:
  Reducing Fringes: {T7, T6}, {T4}, {T3}, {T1}
  Non-reducing Fringes: {T2}, {T5}
  AvailableNodes Set is { } (empty) now. None of the steps below will change it.

The "Fourth Step" sorts reducing fringes into a list [{T3}, {T4}, {T1}, {T7, T6}].

The "Fifth Step" figures out the best position for the primetable in the sorted list of reducing fringes. The position is determined to be after fringe {T3}.

The "Sixth Step" does nothing since availableNodes set is { } (empty) now.

Figure 18:
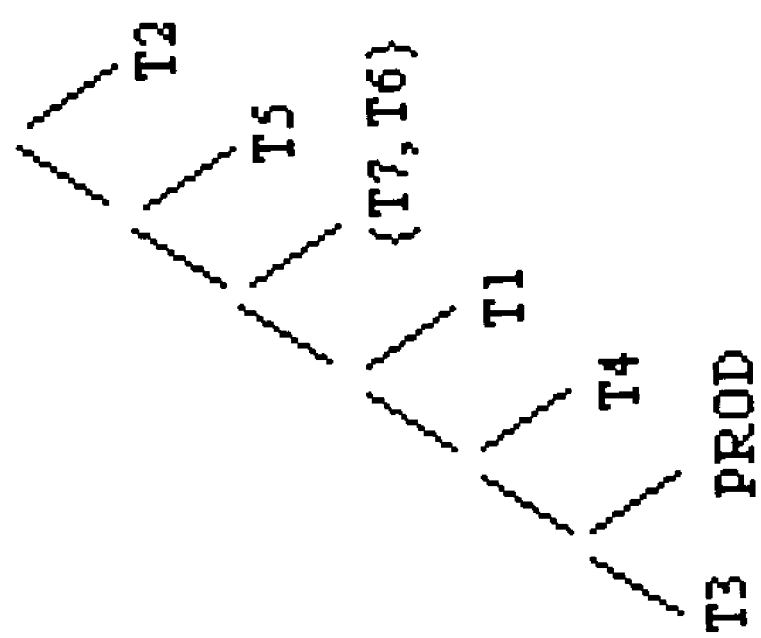
FIG. 18 illustrates an exemplary join tree in accordance with one embodiment.

The join tree shown in FIG. 18 is then created.

Let's now follow the algorithm for the snowflake schema of FIG. 13.

The "First Step" produces a sorted list of JBBCs [FactTable, T9, T8, T7, T6, T5, T4, T3, T2, T1]. From this list we figure out FactTable to be the primetable.

The "Second Step" gives the availableNodes set {T1, T2, T3, T4, T5, T6, T7, T8, T9}.

The "Third Step" gives fringes categorized in reducing and non-reducing fringes as follows:
  Reducing Fringes: {T1, T2, T9}, {T3, T4, T8}, {T5, T6, T7}
  Non-reducing Fringes: { }
  AvailableNodes Set is { } (empty) now. None of the steps below will change it.

The "Fourth Step" sorts reducing fringes into a list: [{T1, T2, T9}, {T3, T4, T8}, {T5, T6, T7}].

The "Fifth Step" figures out the best position for the primetable in the sorted list of reducing fringes. The position is determined to be after fringe {T1, T2, T9}.

The "Sixth Step" does nothing since the availableNodes set is { } (empty) now.

Figure 19:
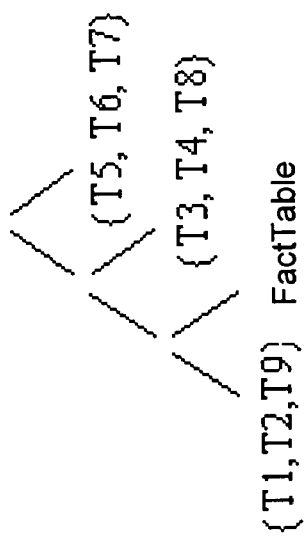
FIG. 19 illustrates an exemplary tree in accordance with one embodiment.

The tree of FIG. 19 is then created.

This rule is invoked on the multi-join for each one of the fringes. Therefore the algorithm is applied to the fringes which in this case (i.e. snowflake schema) are star schemas themselves.

Figure 20:
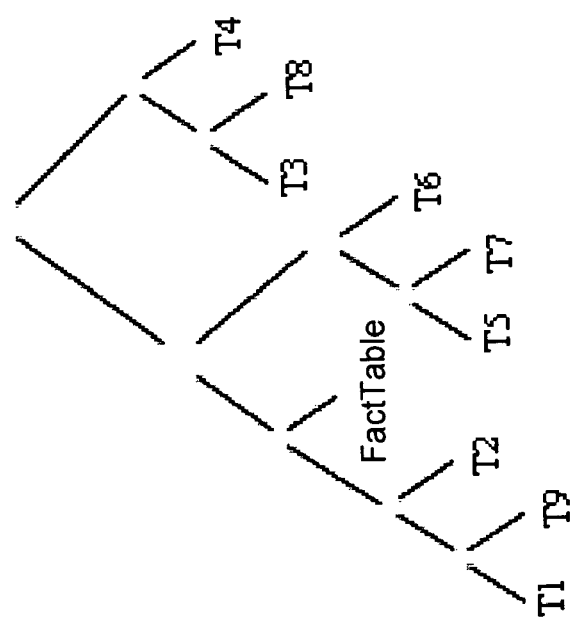
FIG. 20 illustrates an exemplary bushy tree in accordance with one embodiment.

Recursive application of the MJPrimeTableRule on the fringes results in the bushy tree of FIG. 20.

Fringes

The simplest way to define a fringe is as a set of tables that when joined to the prime-table either reduces it or doesn't increase its size by more than a certain threshold (currently by more than 5%). We will define a fringe in the context of a star schema/snowflake schema. A fringe can be thought of as a ray of the star in a star schema or a flake of the snowflake in a snowflake schema.

The fringes in FIG. 12 are: {T1}, {T2}, {T3}, {T4}, {T5} and {T6, T7}. The Fringes in FIG. 13 are: {T1, T2, T9}, {T3, T4, T8} and {T5, T6, T7}.

A fringe starts from a JBBC connected to the primetable. It is computed recursively in a depth first manner by joining JBBCs at each level of recursion such that the join is not an increasing join.

Consider the fringe {T1, T2, T9} as an example. The fringe starts from T9, which is connected to the prime table. At this point the fringe is {T9}. T9 is joined to T1. This is a reducing join. The fringe thus becomes {T1, T9}. {T1, T9} is joined to T2. This is not a reducing join but, it is not an increasing join either. Thus, the fringe now becomes {T1, T2, T9}.

Available nodes are also passed in as a parameter when computing fringes so as to make sure that we don't include any nodes that are already part of some other fringe.

Exemplary Computer System

Figure 21:
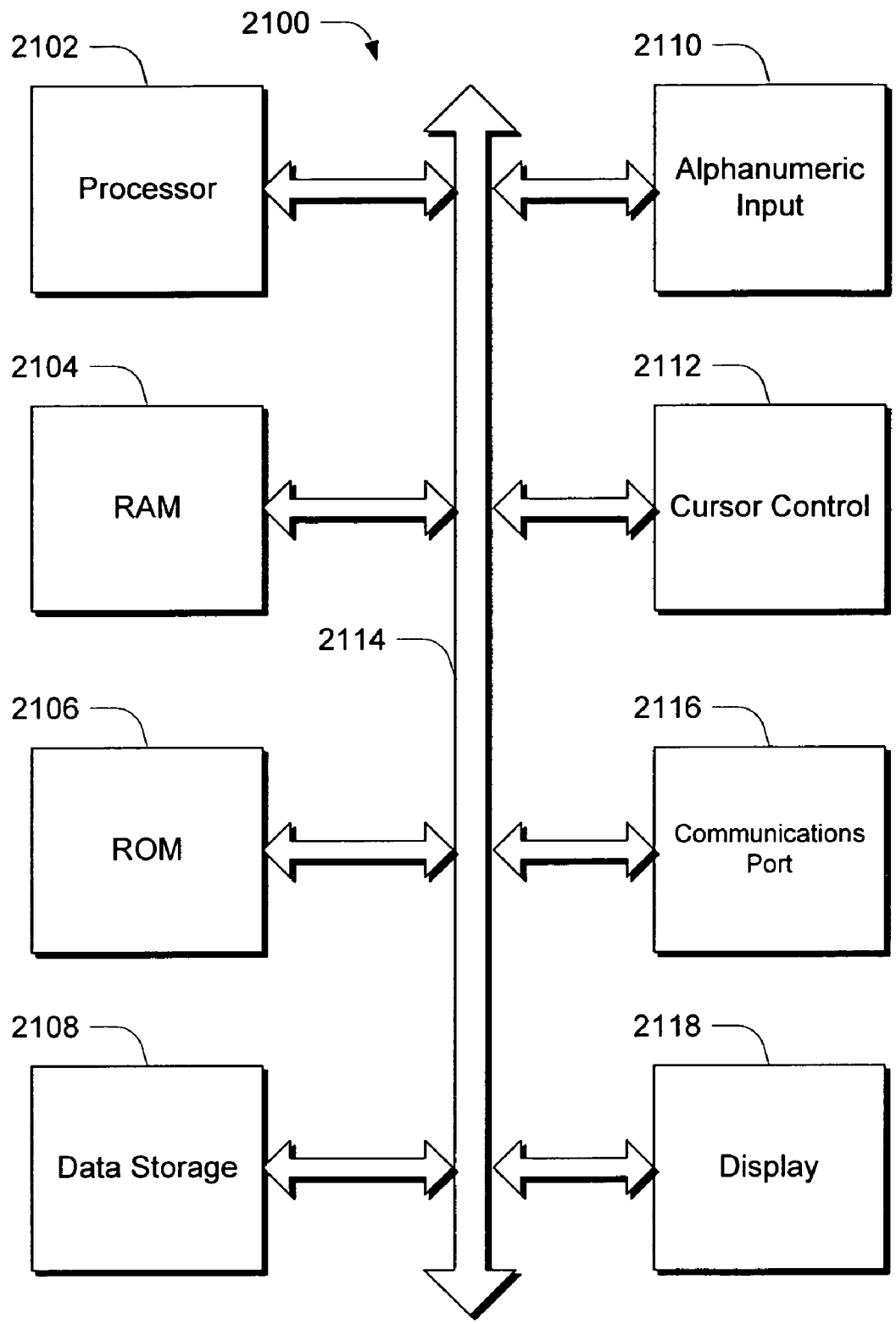
FIG. 21 illustrates an exemplary computer system that can be utilized to practice one or more of the embodiments described herein.

In one embodiment, the above-described systems can be practiced on a computer system 2100 such as the one shown in FIG. 21, and the techniques described in this document can reside in computer readable media in the computer system in the form of computer-readable and executable stored instructions.

Referring to FIG. 21 an exemplary computer system 2100 (e.g., personal computer, workstation, mainframe, etc.) is configured with a data bus 2114 that communicatively couples various components. As shown in FIG. 21, a processor 2102 is coupled to bus 2114 for processing information and instructions. A computer readable volatile memory such as RAM 2104 is also coupled to bus 2114 for storing information and instructions for the processor 2102. Moreover, computer-readable read only memory (ROM) 2106 is also coupled to bus 2114 for storing static information and instructions for processor 2102. A data storage device 2108, such as a magnetic or optical disk media is also coupled to bus 2114. Data storage device 2108 is used for storing large amounts of information and instructions. An alphanumeric input device 2110 including alphanumeric and function keys is coupled to bus 2114 for communicating information and command selections to the processor 2102. A cursor control device 2112 such as a mouse is coupled to bus 2114 for communicating user input information and command selections to the central processor 2102. Input/output communications port 2116 is coupled to bus 2114 for communicating with a network, other computers, or other processors, for example. Display 2118 is coupled to bus 2114 for displaying information to a computer user. Display device 2118 may be a liquid crystal device, cathode ray tube, or other display device suitable for creating graphic images and alphanumeric characters recognizable by the user. The alphanumeric input 2110 and cursor control device 2112 allow the computer user to dynamically signal the two dimensional movement of a visible symbol (pointer) on display 2118.

CONCLUSION

The embodiments described above can provide a rule-based optimizer with relevant query level analysis beyond the scope of a rule's binding sub-tree. This, in turn, can enable more intelligent exploration and pruning decisions.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A computer-implemented method comprising:
receiving a normalized query tree;
dividing the normalized query tree into regions of multiple join backbones that refer to multi-way joins between two or more relational expressions;
analyzing the regions of the normalized query tree to collect information about:
join operators and their children, and
tables in an associated query; and
making said information available to a rule based optimizer that produces, from the normalized query tree, an execution plan that visits only parts of a search space rather than using a pruning technique to reduce the search space.

2. The method of claim 1, wherein the act of analyzing is performed by:
conducting join backbone analysis, wherein a join backbone comprises a multi-way join between two or more relational expressions; and
conducting table connectivity analysis which collects predicate relationship information.

3. The method of claim 2, wherein the act of analyzing comprises defining a node analysis data structure that holds collected information, said node analysis data structure being associated with one or more group analysis data structures;
wherein at least some individual operator nodes are assigned a node analysis structure, the node analysis structure being associated with a join backbone child analysis data structure that captures relationship information between a particular join backbone child and its sibling join backbone children within a join backbone and a table analysis data structure that captures predicate connectivity relations between a table and other tables in a query.

4. The method of claim 3, wherein the join backbone child analysis data structure captures relationship information comprising joined join backbone children, joining predicates with each join backbone child, and join types.

5. The method of claim 3, wherein the table analysis data structure is structured to enable lookup for available access paths, natural sort orders and partitioning.

6. The method of claim 3, wherein said data structures are accessible from within the rule base optimizer.

7. A computer-implemented method comprising:
receiving a normalized query tree;
recursively traversing the normalized query tree and assigning analysis constructs as follows:
(a) creating a node analysis object with table analysis object for each scan expression and assigning the node analysis object to a group analysis object of a group attributes object of the associated scan node; and
(b) assigning a node analysis object with join backbone child object to individual expressions that are children of a join expression, the node analysis object being assigned to a group analysis object of a group attributes object of the join expression;
invoking a join backbone analysis task that associates join backbone children with their associated join backbone parents and computing relationships between sibling join backbone children;
invoking a table connectivity analysis task that captures connectivity relationships between different base columns and base tables in a query; and
using the join backbone analysis task and the table connectivity analysis task to produce an execution plan that visits only parts of a search space rather than using a pruning technique to reduce the search space.

8. The method of claim 7, wherein the act of computing relationships is performed by computing join predicates, join types and join data flow reductions.

9. The method of claim 7, wherein the table connectivity analysis task captures said connectivity relationships as a hyper-graph in which nodes in the hyper-graph represent base columns and connections represent predicates in the normalized query tree.

10. The method of claim 9, wherein connection predicates are selected from a group of connection predicates comprising:
a reference connection which considers two or more nodes to be connected if they are both referenced by a predicate, or
an equivalence connection which considers two or more nodes connected if they have an equality predicate.

11. The method of claim 10, wherein said act of invoking a table connectivity analysis task comprises:
recursively traversing the normalized query tree;
for each expression in the normalized query tree, analyzing the selection predicate including, for join expressions, analyzing the join predicate by traversing the scalar expression tree of each predicate looking for base column references, wherein if a predicate is an equality predicate, gathering information about base column members of the equality relationship;
setting predicate-column associations and resulting column-column associations; and
setting consequent table-table and table-column connectivity associations.

12. The method of claim 7, wherein said acts of recursively traversing the normalized query tree, invoking a join backbone analysis task and invoking a table connectivity analysis task develops information; and
further comprising making said information available to a rule based optimizer that is configured to produce, from the normalized query tree, an execution plan.

13. A system comprising:
one or more processors;
one or more computer-readable media;
computer-readable instructions on the one or more computer-readable media which, when executed by the one or more processors, cause the one or more processors to implement a method comprising:
dividing the normalized query tree into regions of multiple join backbones that refer to multi-way joins between two or more relational expressions;
receiving a normalized query tree;
analyzing the regions of the normalized query tree to collect information about:
join operators and their children, and
tables in an associated query; and
making said information available to a rule based optimizer that produces, from the normalized query tree, an execution plan that visits only parts of a search space rather than using a pruning technique to reduce the search space.

14. The system of claim 13, wherein the act of analyzing is performed by:
   conducting join backbone analysis, wherein a join backbone comprises a multi-way join between two or more relational expressions; and
   conducting table connectivity analysis which collects predicate relationship information.

15. The system of claim 14, wherein the act of analyzing comprises defining a node analysis data structure that holds collected information, said node analysis data structure being associated with one or more group analysis data structures;
   wherein at least some individual operator nodes are assigned a node analysis structure, the node analysis structure being associated with a join backbone child analysis data structure that captures relationship information between a particular join backbone child and its sibling join backbone children within a join backbone and a table analysis data structure that captures predicate connectivity relations between a table and other tables in a query.

16. The method of claim 15, wherein the join backbone child analysis data structure captures relationship information comprising joined join backbone children, joining predicates with each join backbone child, and join types.

17. The method of claim 15, wherein the table analysis data structure is structured to enable lookup for available access paths, natural sort orders and partitioning.

18. The method of claim 15, wherein said data structures are accessible from within the rule base optimizer.

* * * * *

UNITED STATES PATENT AND TRADEMARK OFFICE
CERTIFICATE OF CORRECTION

PATENT NO. : 8,145,627 B2  
APPLICATION NO. : 11/150388  
DATED : March 27, 2012  
INVENTOR(S) : Awny K. Al-Omari Page 1 of 1

It is certified that error appears in the above-identified patent and that said Letters Patent is hereby corrected as shown below:

In the Claims:

In column 24, line 6, in Claim 16, delete "The method of claim" and insert -- The system of claim --, therefor.

In column 24, line 10, in Claim 17, delete "The method of claim" and insert -- The system of claim --, therefor.

In column 24, line 13, in Claim 18, delete "The method of claim" and insert -- The system of claim --, therefor.

Signed and Sealed this  
Twentieth Day of August, 2013

Teresa Stanek Rea  
*Acting Director of the United States Patent and Trademark Office*